(12) United States Patent
Cook et al.

(10) Patent No.: US 11,079,252 B2
(45) Date of Patent: Aug. 3, 2021

(54) METHODS, APPARATUS AND SYSTEMS FOR GYROSCOPE SCALE CALIBRATION

(71) Applicant: IDHL Holdings, Inc., Wilmington, DE (US)

(72) Inventors: Bryan A. Cook, Silver Spring, MD (US); Yun Li, Clarksburg, MD (US); Mark Turner, Ijamsville, MD (US)

(73) Assignee: IDHL HOLDINGS, INC., Wilmington, DE (US)

( * ) Notice: Subject to any disclaimer, the term of this patent is extended or adjusted under 35 U.S.C. 154(b) by 84 days.

(21) Appl. No.: 16/473,321

(22) PCT Filed: Jan. 5, 2018

(86) PCT No.: PCT/US2018/012608
§ 371 (c)(1),
(2) Date: Jun. 25, 2019

(87) PCT Pub. No.: WO2018/129335
PCT Pub. Date: Jul. 12, 2018

(65) Prior Publication Data
US 2019/0368892 A1 Dec. 5, 2019

Related U.S. Application Data

(60) Provisional application No. 62/580,764, filed on Nov. 2, 2017, provisional application No. 62/557,728, filed (Continued)

(51) Int. Cl.
*G01C 25/00* (2006.01)
*G01C 21/16* (2006.01)
(Continued)

(52) U.S. Cl.
CPC ......... *G01C 25/005* (2013.01); *G01C 21/165* (2013.01); *G01P 15/14* (2013.01)

(58) Field of Classification Search
CPC ...... G01C 25/005; G01C 21/165; G01P 15/14
See application file for complete search history.

(56) References Cited

U.S. PATENT DOCUMENTS

2009/0326851 A1 12/2009 Tanenhaus
2011/0167893 A1* 7/2011 Frey, Jr. ............... G01C 25/005
73/1.77
(Continued)

OTHER PUBLICATIONS

Looney, Mark, "A Simple Calibration for MEMS Gyroscopes", EDN Europe, www.edn-europe.com, pp. 28-31, Jul. 2010, 4 pages.

*Primary Examiner* — Herbert K Roberts
*Assistant Examiner* — John M Royston
(74) *Attorney, Agent, or Firm* — Eric Berkowitz

(57) ABSTRACT

Methods, apparatus, and systems for estimating and calibrating a gyroscope's scale using a magnetometer mounted on the same device by rotating the device about an axis multiple times; and, during the first rotation, storing the magnetometer magnetic field reading and a heading (from integration of the gyroscope readings) at each of a plurality of angular reference points; then, during each subsequent rotation, determining magnetometer/gyroscope-heading output pairs for which the magnetometer output matches the magnetometer reading corresponding to one of the reference points, thereby indicating that the device has reached the same heading as the matching reference point; then, for each matching output sample pair, using that magnetometer/gyroscope-heading output sample pair to update the gyroscope scale factor for the corresponding angular reference point; and averaging those scale estimates to generate a final gyroscope scale factor estimate.

12 Claims, 17 Drawing Sheets

Related U.S. Application Data on Sep. 12, 2017, provisional application No. 62/443,279, filed on Jan. 6, 2017.

(51) Int. Cl.
*G01F 15/14* (2006.01)
*G01P 15/14* (2013.01)

(56) References Cited

U.S. PATENT DOCUMENTS

| | | | |
|---|---|---|---|
| 2011/0257927 A1* | 10/2011 | Bharadwaj | G01C 25/005 702/150 |
| 2014/0168264 A1* | 6/2014 | Harrison | G02B 27/0176 345/633 |
| 2017/0112440 A1* | 4/2017 | Mauri | A61B 5/11 |

* cited by examiner

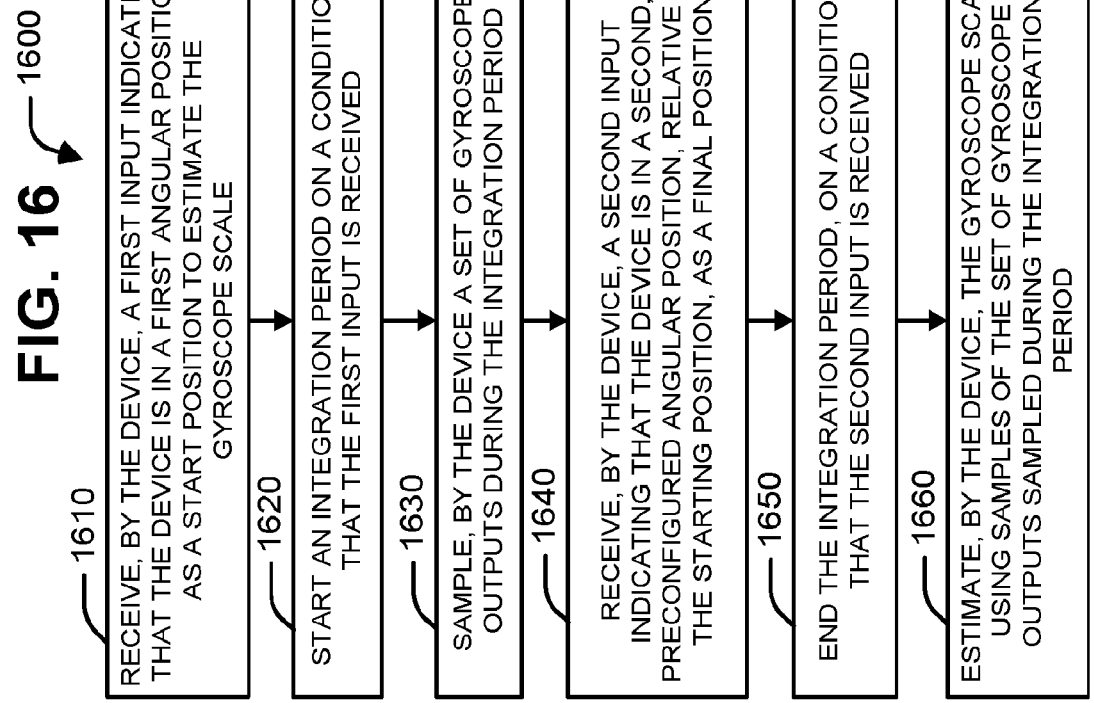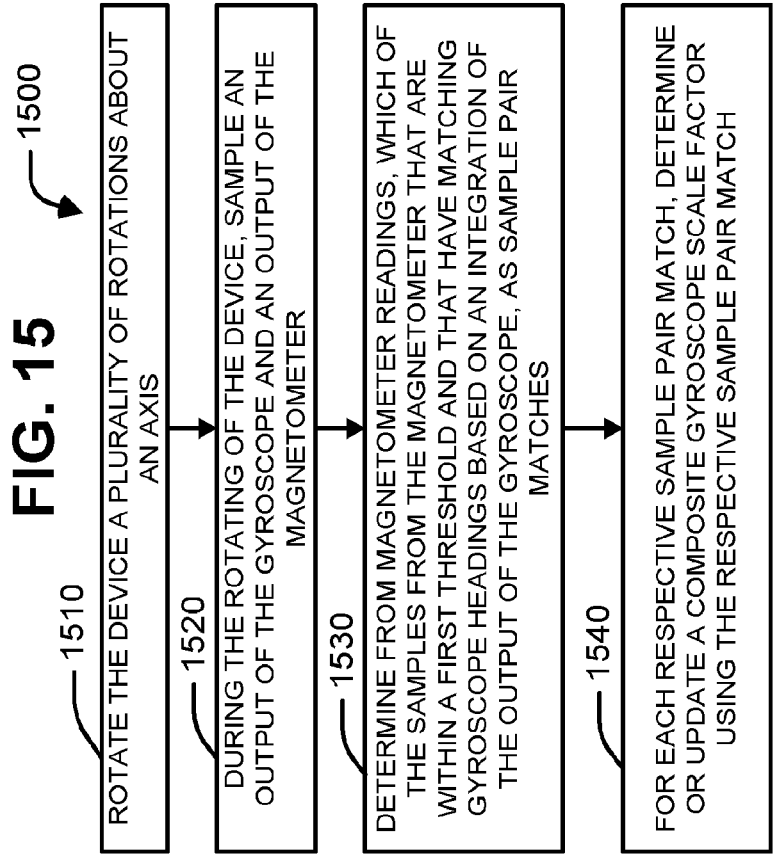

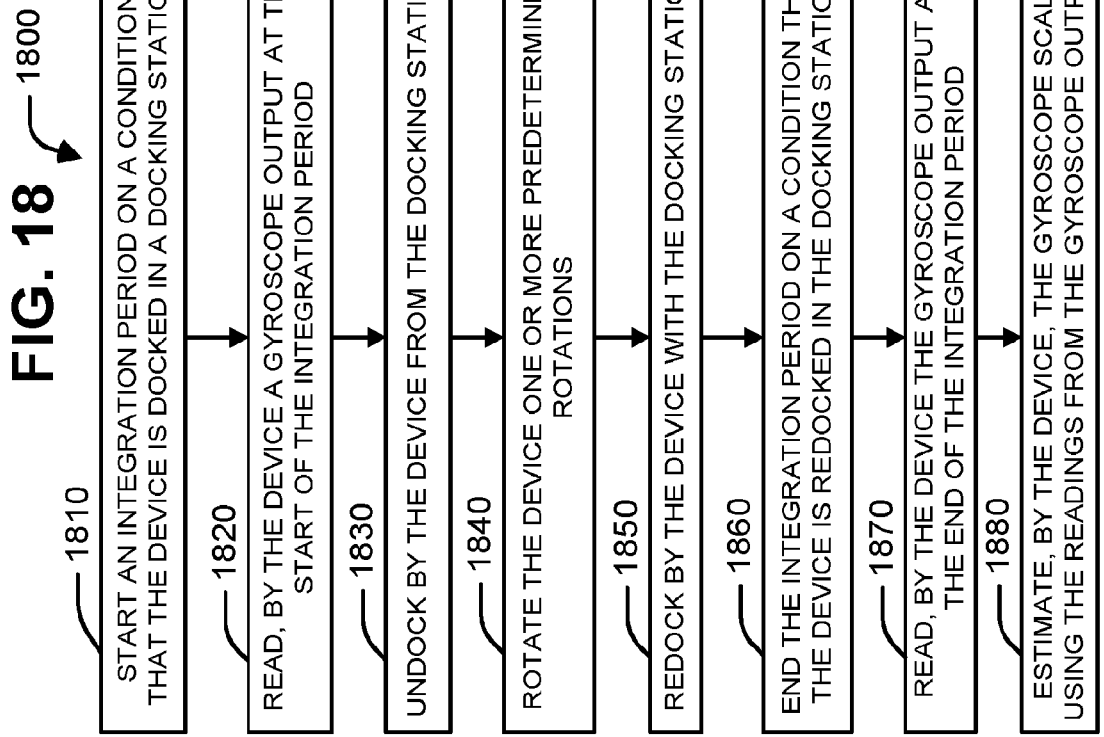
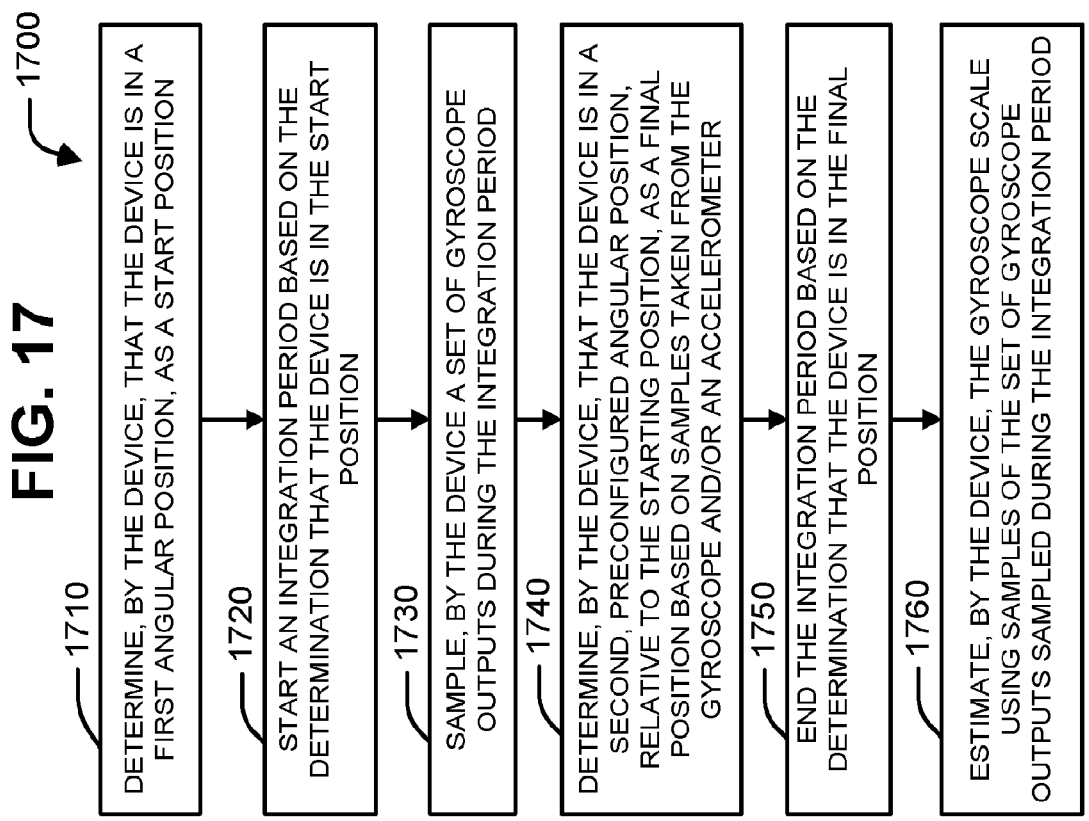

METHODS, APPARATUS AND SYSTEMS FOR GYROSCOPE SCALE CALIBRATION

CROSS REFERENCE TO RELATED APPLICATIONS

This application is a National Stage Application under 35 U.S.C. 371 of International Application No. PCT/US2018/012608, filed Jan. 5, 2018 and This application claims priority from U.S. Provisional Patent Application No. 62/580,764, filed Nov. 2, 2017, U.S. Provisional Patent Application No. 62/557,728, filed Sep. 12, 2017 and U.S. Provisional Patent Application No. 62/443,279, filed Jan. 6, 2017, the contents of each of which are hereby incorporated herein by reference as if fully set forth.

FIELD

Embodiments disclosed herein generally relate to sensor calibration and, for example to methods, apparatus and systems for gyroscope scale calibration.

RELATED

Gyroscopes may be calibrated, for example to enable measurement of angular velocity.

SUMMARY

According to certain embodiments, a device, e.g., a robotic vacuum cleaner, an Inertial Measurement Unit (IMU) and/or a Wireless Transmit/Receive unit (WTRU), may include at least one gyroscope and at least one magnetometer, wherein one or more readings taken by the magnetometer may be used to compensate for at least one parameter associated with the gyroscope.

According to certain embodiments, a scale of a gyroscope may be calibrated using plural magnetic field measurements (e.g., in a range of about 10 to 12 field measurements) acquired during one or more successive rotations (in a range of about 3 to 5 or more rotations of 360°) of the gyroscope and magnetometer at substantially the same angular positions.

According to certain embodiments, a scale of a gyroscope may be calibrated on-board the mobile device (e.g., the robotic vacuum cleaner, the WTRU and/or the IMU, among others), for example using a calibration device.

BRIEF DESCRIPTION OF THE DRAWINGS

A more detailed understanding may be had from the detailed description below, given by way of example in conjunction with drawings appended hereto. Figures in description, are examples. As such, the Figures and the detailed description are not to be considered limiting, and other equally effective examples are possible and likely. Furthermore, like reference numerals in the figures indicate like elements, and wherein:

FIG. 15 is a flowchart of a representative method to estimate a gyroscope scale factor;

FIG. 16 is a flowchart of another representative method to estimate a gyroscope scale;

FIG. 17 is a flowchart of an additional representative method to estimate a gyroscope scale; and FIG. 18 is a flowchart of a further representative method to estimate a gyroscope scale.

DETAILED DESCRIPTION

Example Networks for Implementation of the Embodiments

As previously noted, in addition to robotic vacuum cleaners, the invention may be implemented in a robotic vehicle, car, IoT gear, any device that moves, or a WTRU or other communication device, which, in turn, may be used in a communication network. The following section provides a description of some exemplary WTRUs and/or other communication devices and networks in which they may be incorporated.

Figure 1A:
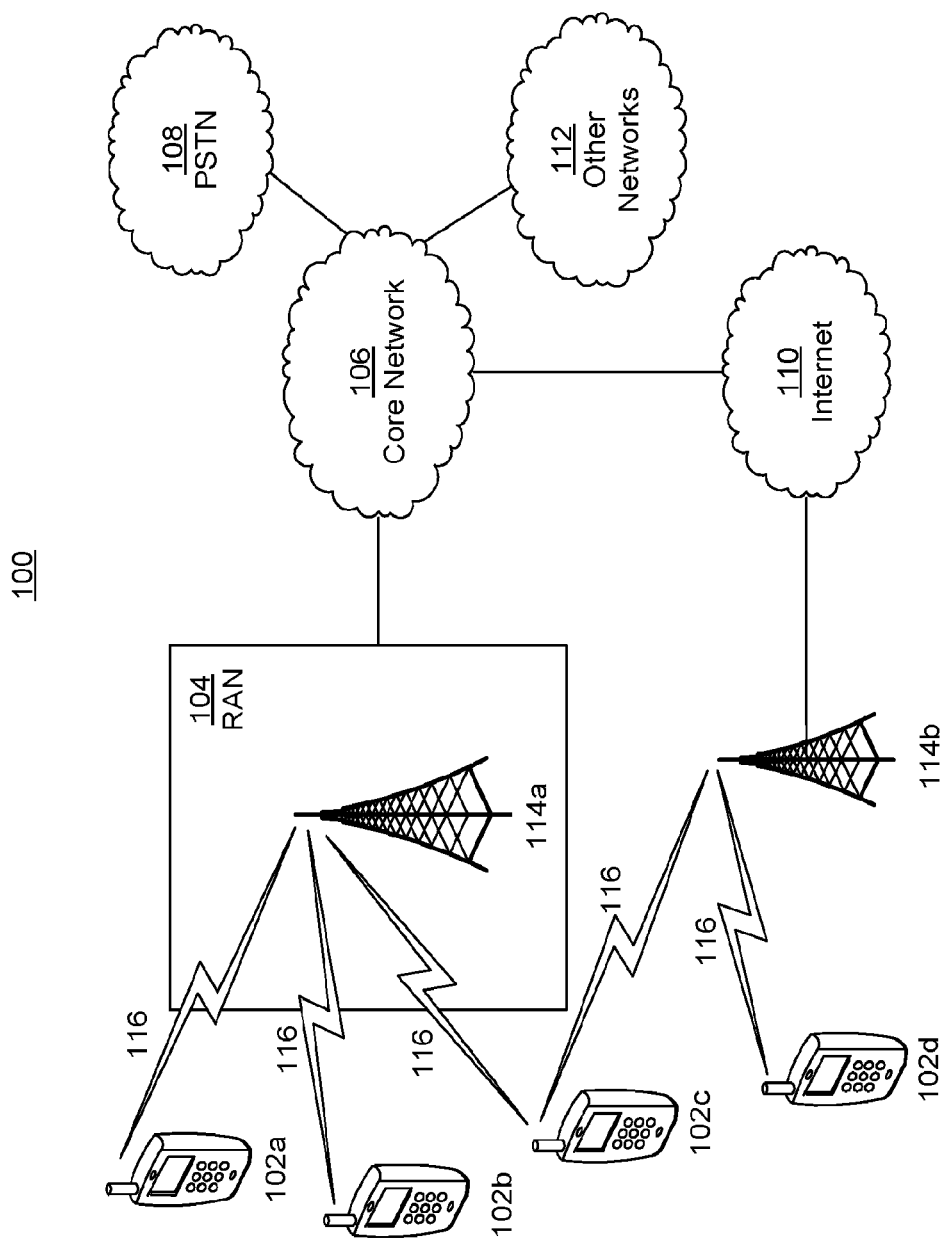
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR Node B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links) For example, the WTRU 102c shown in FIG. 1A may be configured to communicate with the base station 114a, which may employ a cellular-based radio technology, and with the base station 114b, which may employ an IEEE 802 radio technology.

Figure 1B:
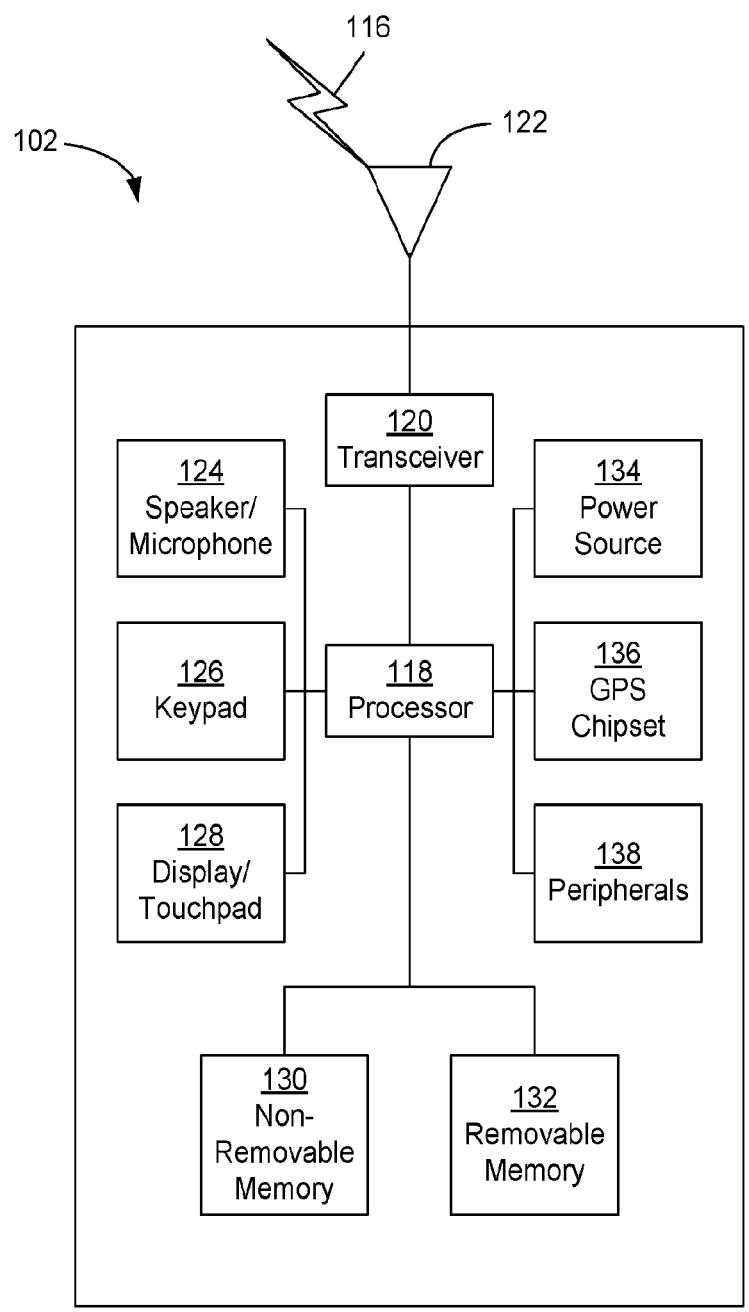
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The processor 118 of the WTRU 102 may operatively communicate with various peripherals 138 including, for example, any of: the one or more accelerometers, the one or more gyroscopes, the USB port, other communication interfaces/ports, the display and/or other visual/audio indicators to implement representative embodiments disclosed herein.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU102 may include a half-duplex radio for which transmission and reception of some or all of the signals (e.g., associated with particular subframes for either the UL (e.g., for transmission) or the downlink (e.g., for reception)).

Figure 1C:
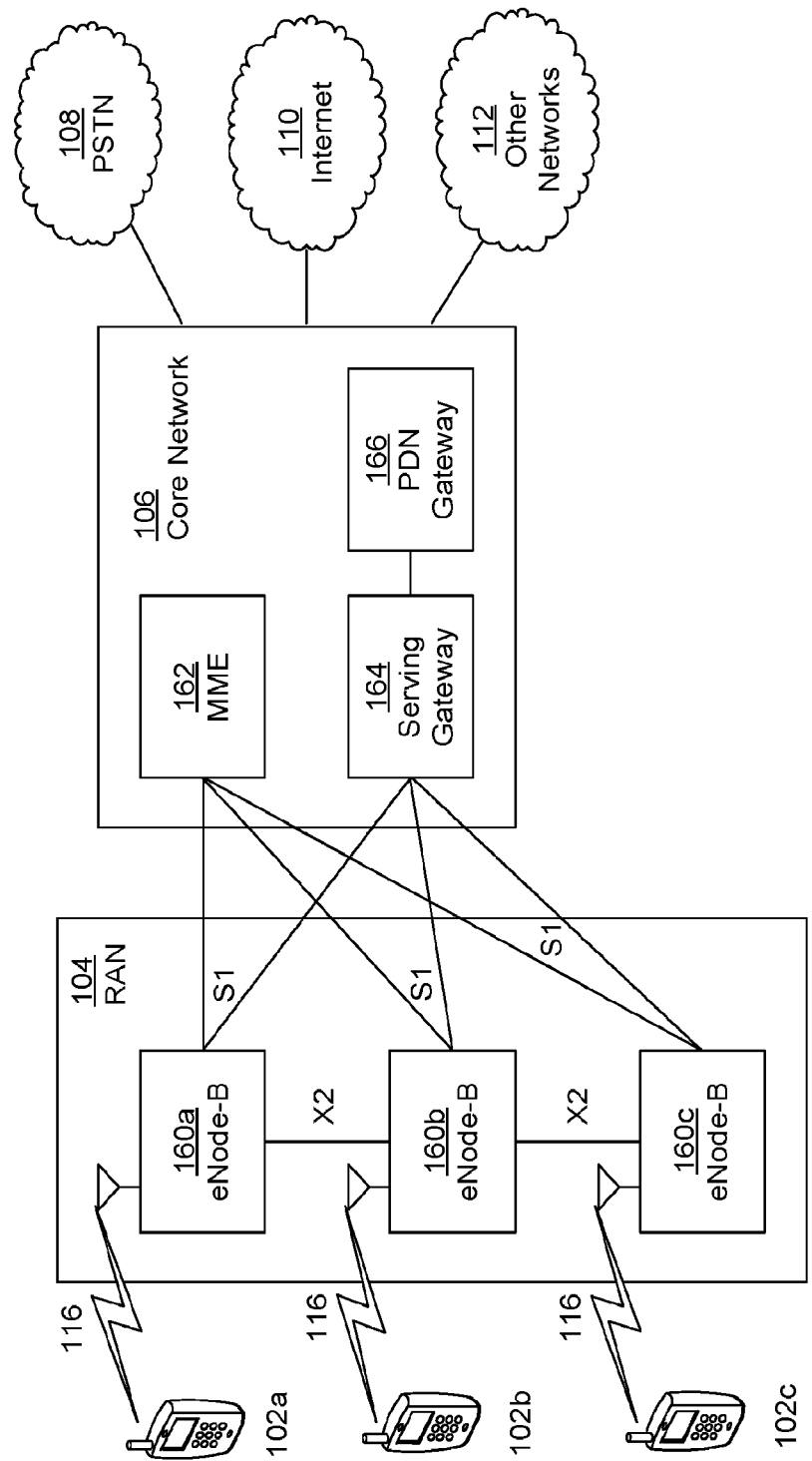
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode Bs 160a, 160b, 160c, though it will be appreciated that the RAN 104 may include any number of eNode Bs while remaining consistent with an embodiment. The eNode Bs 160a, 160b, 160c may each include one or more transceivers for communicating with the WTRUs 102a, 102b, 102c over the air interface 116. In one embodiment, the eNode Bs 160a, 160b, 160c may implement MIMO technology. Thus, the eNode B 160a, for example, may use multiple antennas to transmit wireless signals to, and/or receive wireless signals from, the WTRU 102a.

Each of the eNode Bs 160a, 160b, 160c may be associated with a particular cell (not shown) and may be configured to handle radio resource management decisions, handover decisions, scheduling of users in the UL and/or DL, and the like. As shown in FIG. 1C, the eNode Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel The primary channel may be a fixed width (e.g., 20 MHz wide bandwidth) or a dynamically set width via signaling The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
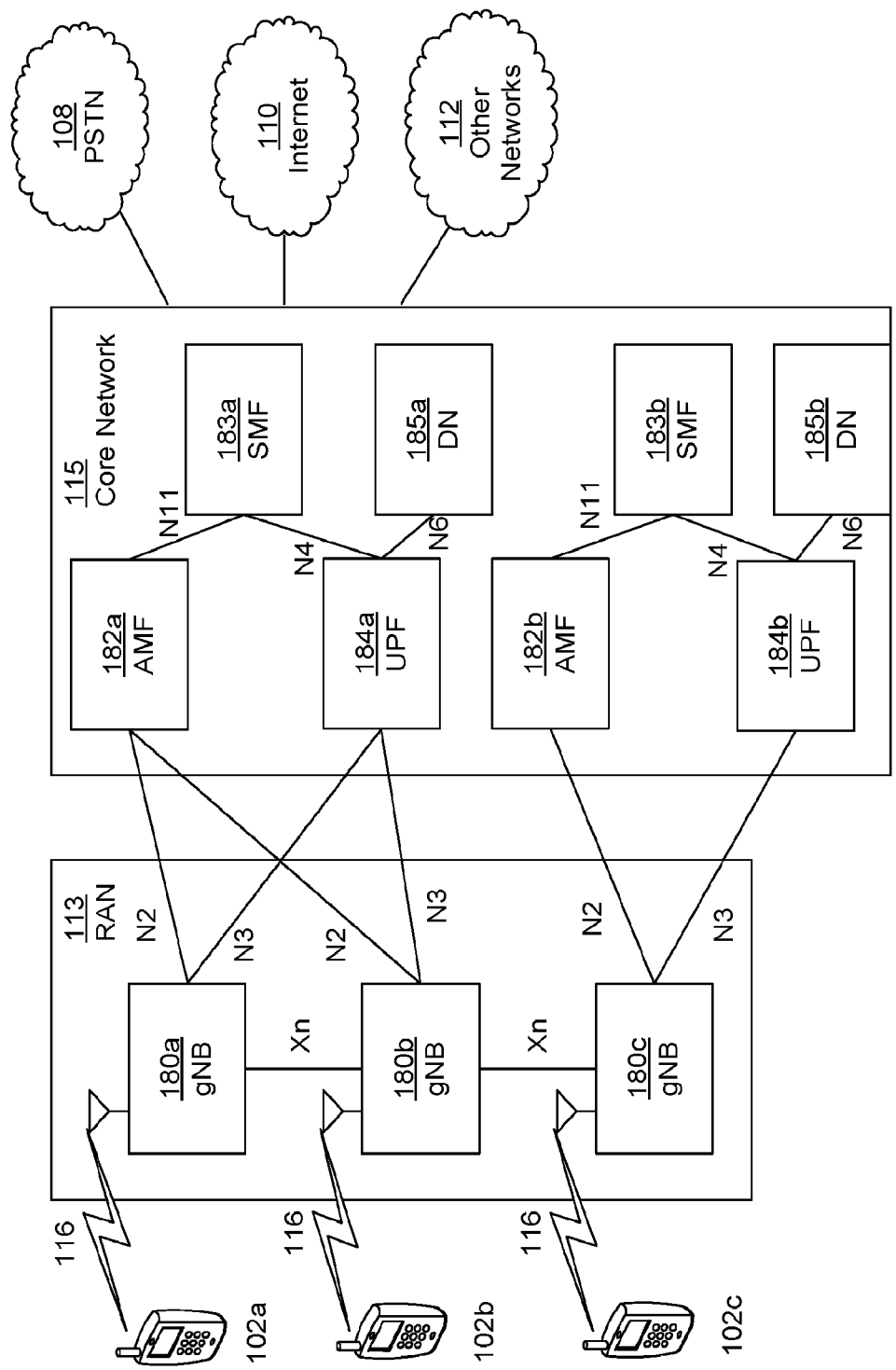
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Embodiments disclosed herein may relate to gyroscope scale calibration techniques, for example using magnetometer measurements in a robotic vacuum cleaner and/or using other scale calibrations including on-device and/or manual scale calibrations, among others. The techniques disclosed herein may be used in other types of devices, for example WTRUs and/or IMUs and/or moving devices, in which one or more gyroscopes may be implemented. In some representative embodiments, the devices may include one or more gyroscopes that may be associated with a magnetometer.

Representative Procedures Using a Magnetometer to Dynamically Calibrate a Gyroscope Scale Robotic vacuum cleaners (RVCs) have become more and more popular as well as diverse. The "robotic" aspect generally means that the vacuum cleaner sweeps the floor without a human operator. The first produced RVCs moved more or less according to a Brownian movement, changing direction when encountering an obstacle. These first RVCs were quickly replaced by RVCs including more sophisticated navigation and sensors systems.

Various types of sensors can be used in RVCs. For example, a gyroscope is a type of sensor often used in navigation to maintain direction or control a directional change. A well-calibrated gyroscope can provide data as to rate of angular change in one or more planes. Accelerometers are used to sense linear accelerations, and/or to provide gravity direction as a reference direction. Magnetometers measure the direction of a magnetic field, which may be the Earth's magnetic field absent other magnetic field sources, which data can be used to determine bearing or direction in one or more planes. A combination of such sensors provides input and feedback to navigation systems of RVCs and other apparatus.

Cameras also may be employed to provide visual clues regarding the environment in which an RVC operates. However, even with a camera system with a 360° field of vision, it is difficult to achieve adequate reliability and accuracy in terms of determining rotation and translation.

At least two factors play a significant role in the reliability and accuracy of gyroscopes in terms of the ability to accurately correlate the gyroscope's readings with angular changes. A first parameter is bias or zero rate offset (ZRO), which is a non-zero reading that occurs even if the gyroscope does not rotate.

The second parameter is the gyroscope's scale or gain, which is a factor by which the gyroscope's reading should be multiplied to convert the gyroscope reading into an angular rate (the angle characterizing the horizontal plane direction change resulting from integrating the angular rate change during the rotation). In other words, gyroscope gain (scaling) is the ratio between the true angular velocity and the measured value. It is often calibrated in the factory on a gimbal or turntable. Gyroscope gain can differ between individual sensors and can change due to conditions like aging and/or temperature.

Dynamic calibration of a gyroscope's gain factor can both save the cost of factory calibration and adapt to changes in gain due to conditions like aging and/or temperature. Although, dynamically calibrating the gain of a gyroscope may be difficult and/or complex, dynamic, post-manufacturing calibration procedures may be implement, for example, to maintain the accuracy of the gyroscope readings over time and changing conditions (e.g., as a correlation to angular change)

Figure 2:
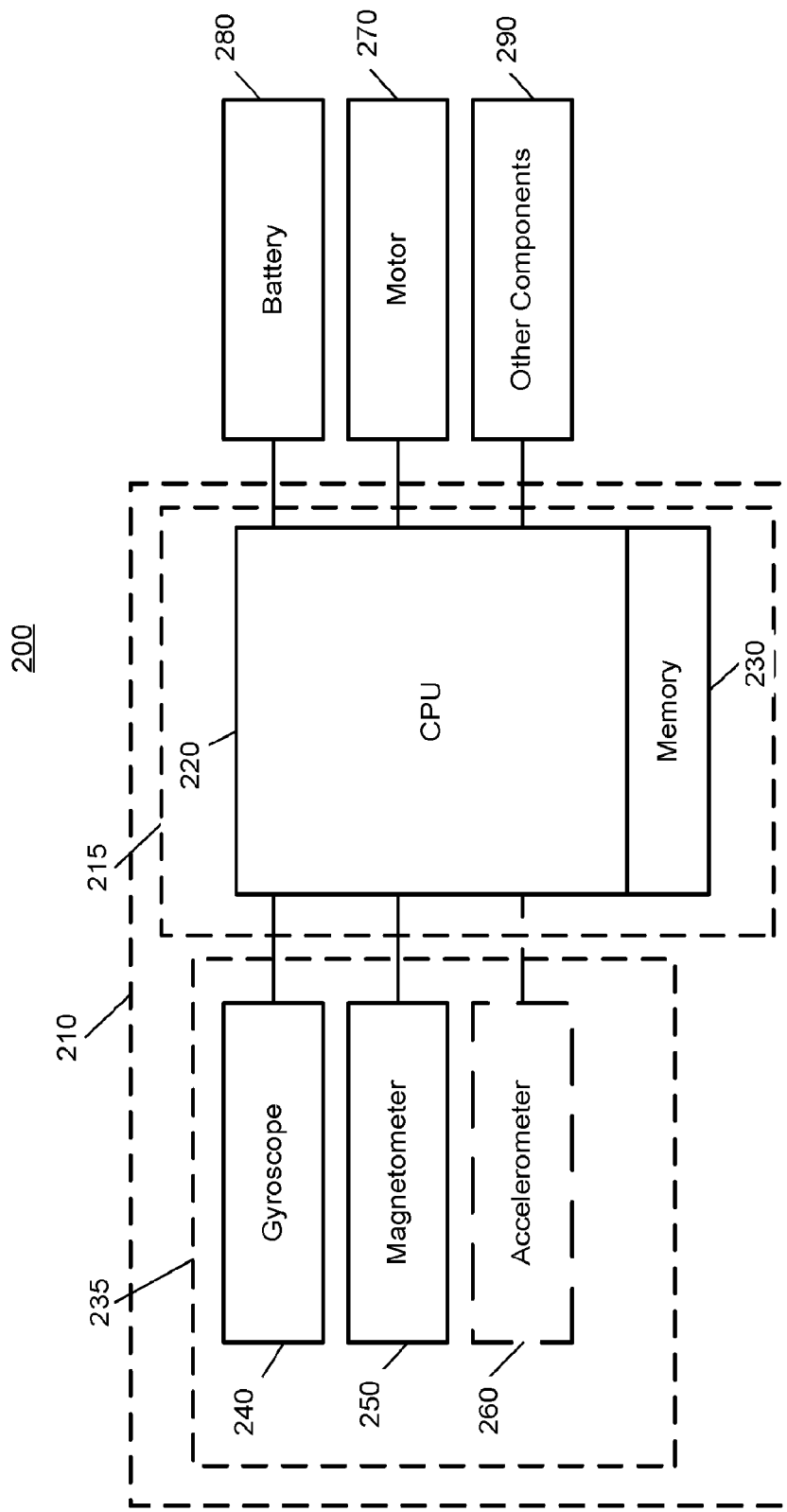
FIG. 2 is a block diagram of a robotic apparatus/appliance (RAA)
Figure 3:
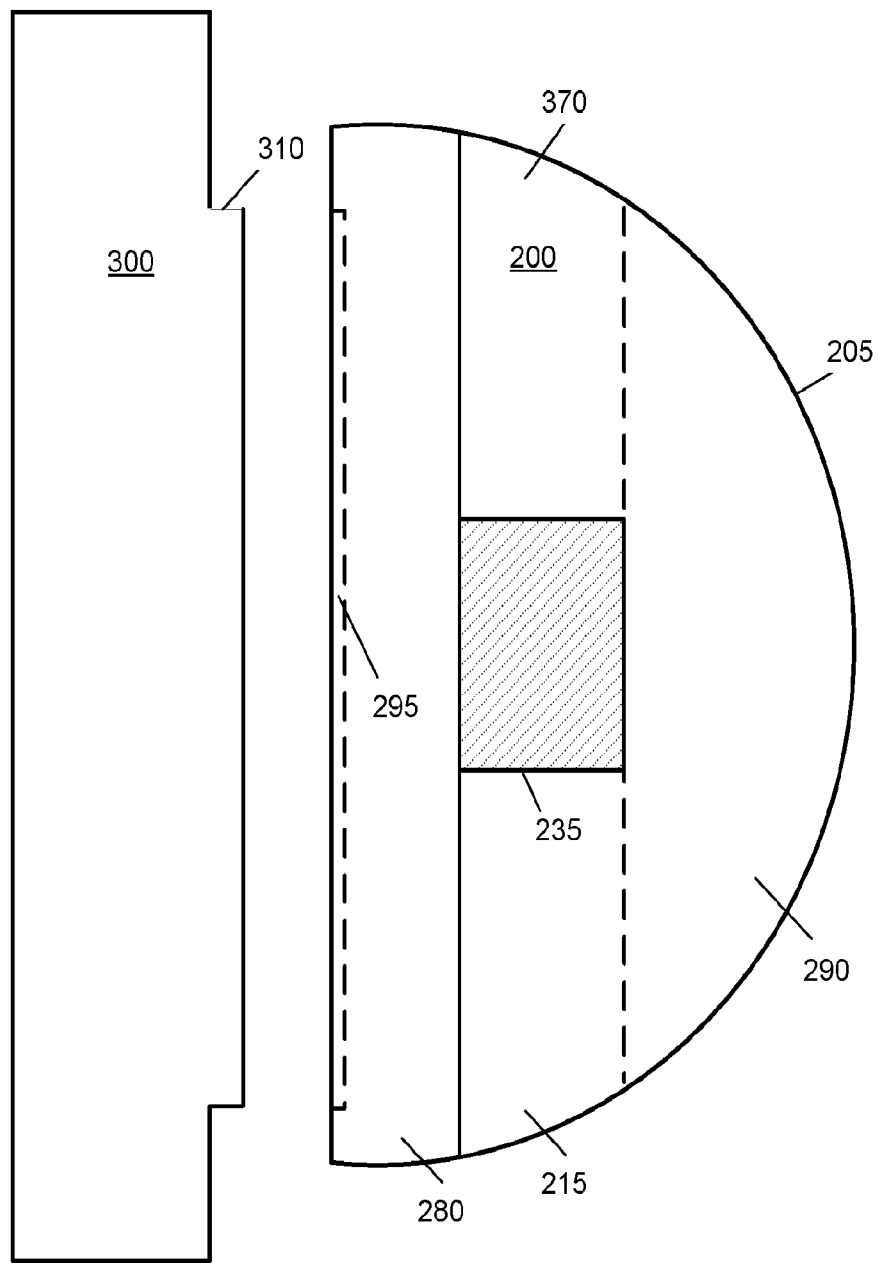
FIG. 3 is a diagram illustrating representative hardware architecture to execute various calibration procedures according to representative embodiments.

FIG. 2 is a diagram illustrating a representative hardware architecture for a robotic appliance/apparatus (RAA) 200 that may be used in various calibration procedures (e.g., for performing a gyroscope calibration using a magnetometer, for on-board calibration procedures and/or for calibration procedures using a predetermined rotation (e.g., a number of 360° rotations), for example of the RAA 200 using a docketing/charging station, among others). FIG. 3 is a block diagram illustrating the representative RAA 200 (e.g., a robotic vacuum cleaner RVC) of FIG. 2 and a representative charging/docketing station 300, in which representative embodiments may be implemented.

Referring to FIG. 2, the RAA 200 (for example a robotic vacuum cleaner RVC, a mobile robot and/or an autonomous vehicle, among others) may include an IMU 210, one or more motors 270, one or more batteries 280 (e.g., rechargeable batteries) and/or one or more other components 290, for example, to enable a robotic task (e.g., a dust bin and/or a vacuum attachment for a robotic vacuum cleaner and/or a robotic arm for a mobile robot, among others). The IMU 210 may include a control unit 215 and/or a sensor package 235.

The control unit 215 may include a processor 220 (e.g., a CPU) and/or a memory 230. The processor 220 may receive information from the sensor package 235. The sensor package 235 may include one or more gyroscopes 240, one or more magnetometers 250, one or more accelerometers 260 and other sensors (not shown).

For example, the processor 220 may receive sample data from the gyroscopes 240, one or more magnetometers 250 and/or the accelerometers 260. The processor 220 may execute instructions from the memory 230 to initiate/execute operations of the RAA including for example a gyroscope calibration procedure, as described herein. The processor 220 may interact with, and/or control, other elements/components of the RAA 200, e.g., the motor 270 to steer the RAA 200, the battery 280, and/or the other components 290 of the RAA 200 such as dust suction components.

Referring now to FIG. 3, the RAA 200 may include a housing 205 with a circular or semi-circular profile in a horizontal plane, and with a height of approximately 2-10 inches. The housing 210 may provide a support structure for a motor 270, a battery 280, a dust bin 290, and/or an IMU 210. The IMU 210 may include a sensor package 235 and/or a control unit 215. The control unit 215 may include a processor 220 and a memory 230. In certain representative embodiments, the sensor package 235 and/or the control unit 215 may be any number of components or may be partially or entirely integrated. In certain representative embodiments, the sensors package 235 may include, for example, a gyroscope 240, a magnetometer 250, an accelerometer 260, and/or other sensors.

When the RAA 200 is not in use, the RAA 200 may be docked at a docking/charging station 300 by the processor 220 of the RAA 200 navigating the RAA 200 to a position for a docking connector 295 of the RAA 200 to couple with (e.g., electrically or magnetically couple with) a docking connector 310 of the docking/charging station 300. For example, the RAA 200 may mate with the docking/charging station 300 for the battery 280 to recharge (e.g., either via a wired connection or wirelessly). The docking/charging station 300 and the RAA 200 may be shaped to properly align the RAA 200 with the docking/charging station 300, for example to ensure proper mating and/or to ensure a reliable and repeatable positioning (e.g., rotational positioning) of the RAA 200 (below a threshold rotational amount) sufficient for gyroscope scale calibration.

Although a single motor is shown in FIG. 2, the RAA 200 may include separate motors, for example in a RVC for suction, and/or for moving the RVC, among others.

The sensor package 235 may include at least a group of inertial sensors (for example any of: a gyroscope 240, a magnetometer 250, and/or an accelerometer 260, among others). Each sensor 240, 250 and/or 260 may provide up to 3 axes of detection. The sensor package 235 may include one or more cameras and/or other sensors. For example, the sensor package 235 may include one or more proximity sensors, one or more bump/contact sensors that may provide information enabling, for example, any of: (1) tilt detection, (2) bump/contact detection, and/or (3) location detection, among others and/or sensors that detect an operational state of the RAA 200 (for example, in certain representative embodiments, wheel slippage, operating temperature and/or bin fullness, among others).

The control unit 215 may include one or more processors and/or dedicated circuits to control the RAA 200 and to interface with a user. The control unit 215 may include hardware and/or software that form a navigation system configured to (e.g., able to) perform simultaneous localization and mapping (SLM). The mapping may be used to plan a trajectory of the RAA 200 (e.g., to plan an efficient trajectory, for movement/operation of the RAA 200). In some representative embodiments, the RAA 200 may be used as a RVC and the control unit 215 may include dedicated hardware and/or software for automatic bin emptying, and/or remote control for spot cleaning, among others.

The navigation system may use readings of the gyroscope 240 to track the heading of the RAA 200 (e.g., to track a motion direction), and/or may use information related to the accelerometer 250 and/or traction system (e.g., wheel rotation information) to track translation of the RAA 200. According to certain embodiments, the scale of the gyroscope 240 may be calibrated using information from the magnetometer 250.

Those skilled in the art appreciate that the disclosed embodiments of the RAA include but are not restricted to a RVC.

Figure 4B:
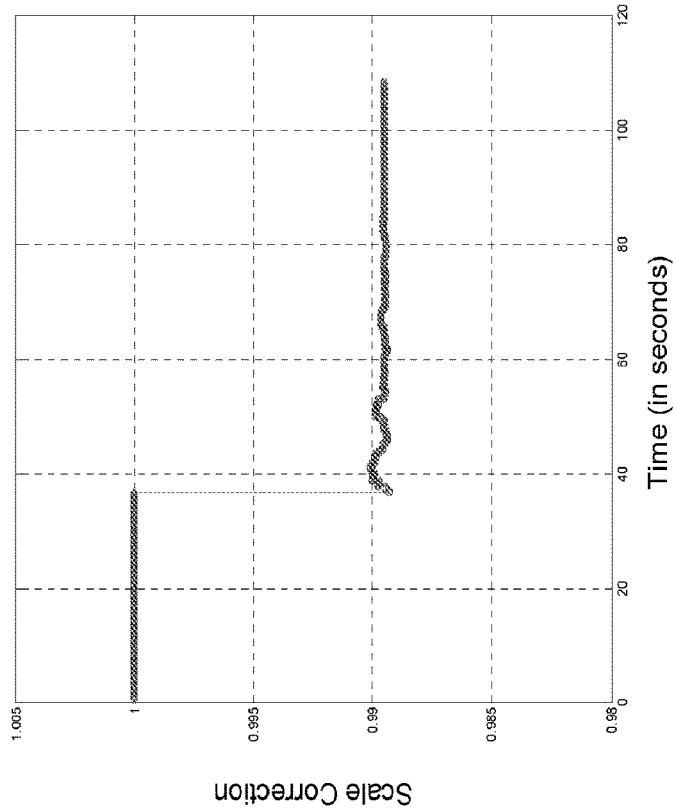
FIGS. 4A and 4B are graphs illustrating a calibration procedure in a first environment.
Figure 4A:
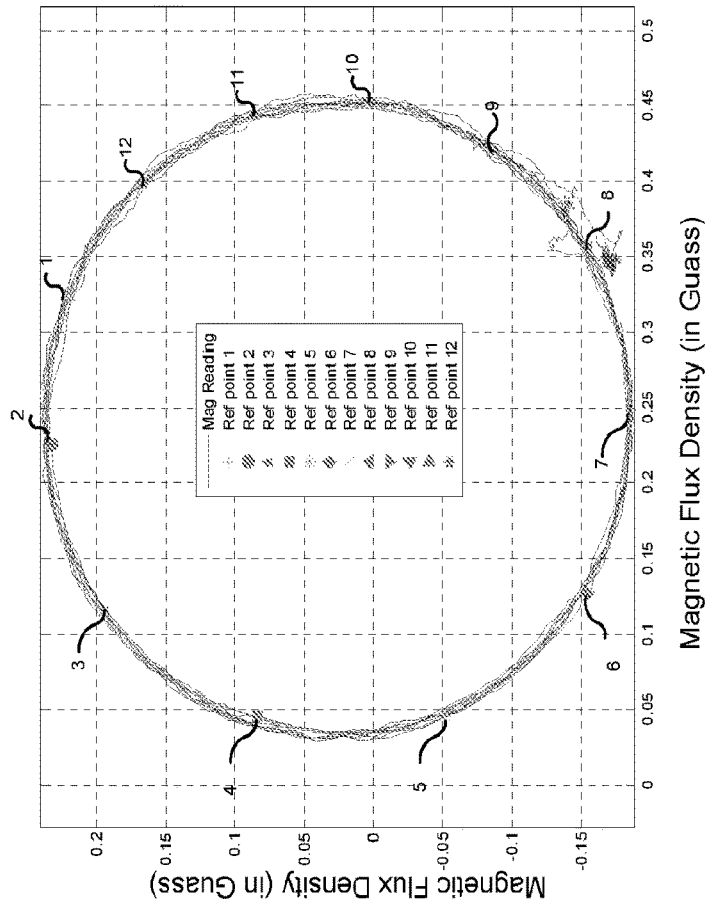
Figure 5B:
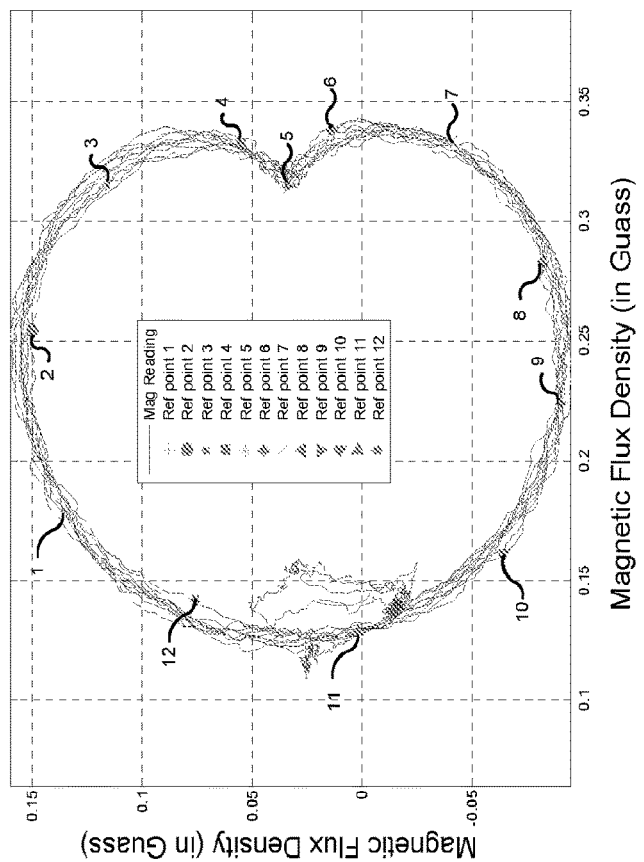
FIGS. 5A and 5B are another set of graphs illustrating the calibration procedure of FIGS. 3A and 3B in a second environment (e.g., a more disruptive magnetic field environment)
Figure 5A:
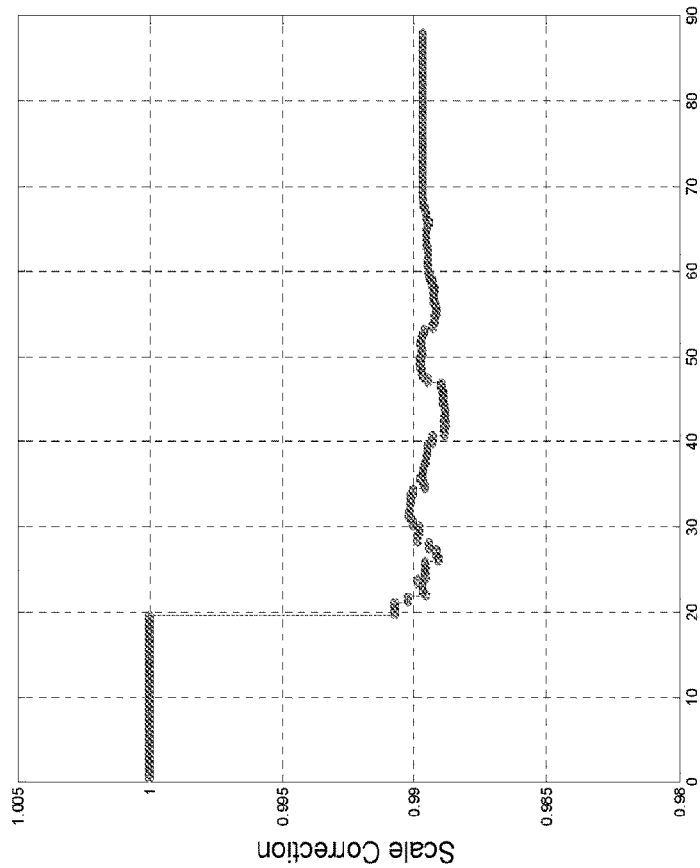
Figure 6A:
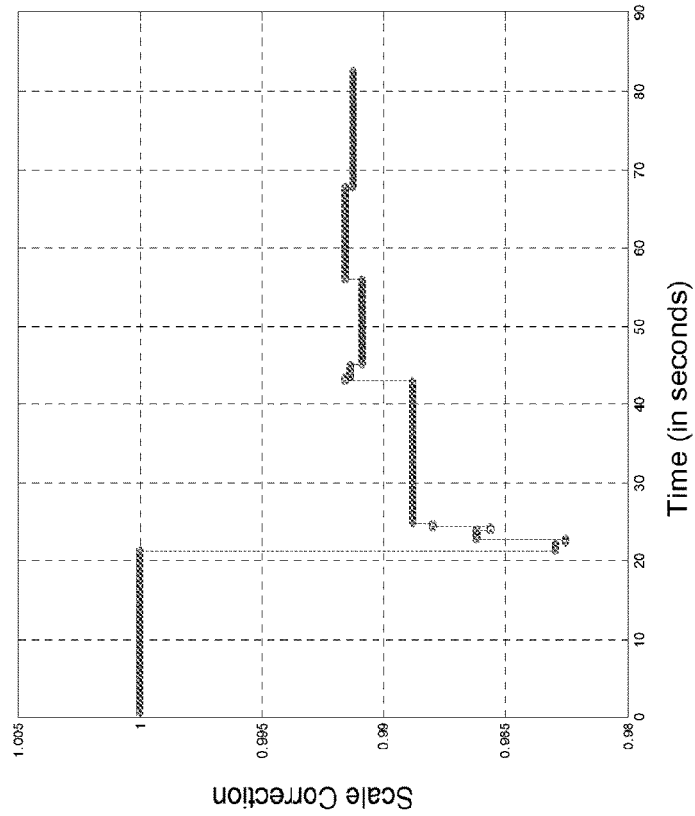
FIGS. 6A and 6B are another set of graphs illustrating the calibration procedure of FIGS. 3A and 3B in a third environment (e.g., an even more disruptive magnetic field environment)
Figure 6B:
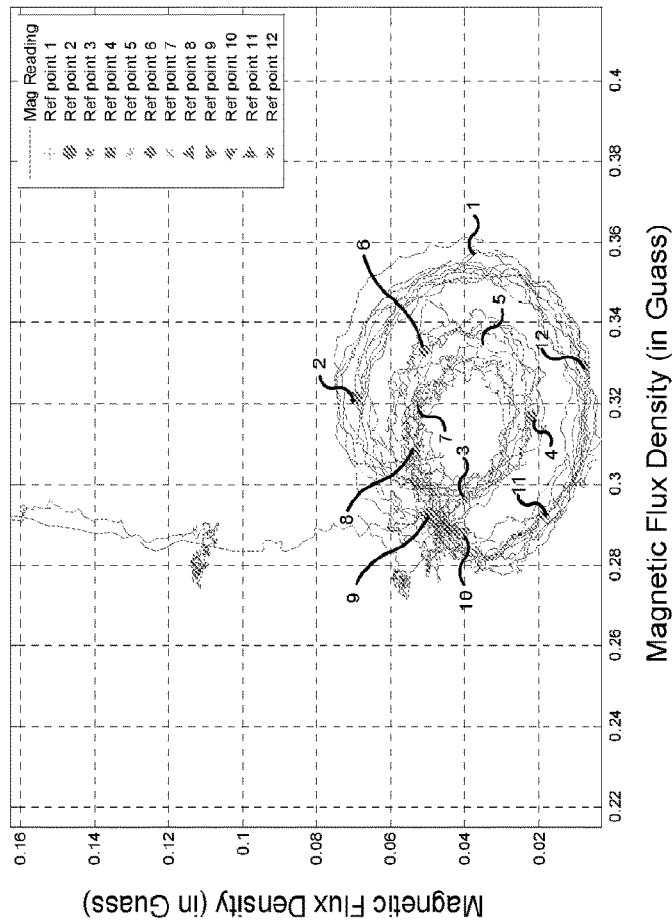

FIGS. 4A and 4B are a set of graphs illustrating a representative calibration procedure in a first environment. FIGS. 5A and 5B are another set of graphs illustrating the calibration procedure of FIGS. 3A and 3B in a second environment (e.g., a more disruptive magnetic field environment). FIGS. 6A and 6B are another set of graphs illustrating the calibration procedure of FIGS. 3A and 3B in a third environment (e.g., an even more disruptive magnetic field environment).

Referring now to FIGS. 4A, 5A and 6A, the RAA 200 may perform and/or may be controlled to perform a plurality of 360° rotations about a vertical axis (the z axis) (hereinafter designated as N+1 rotations). As the RAA 200 rotates, for each such 360° rotation, the magnetometer 250 may measure the magnetic field at a plurality of reference points (e.g., reference points 1-12 in FIGS. 4A, 5A and 6A (the number of reference point hereinafter designated as M reference points). Merely as an example, the reference points may be designated at M=12 evenly spaced angular positions (e.g., bearings, for example every 30°. The reference points may be evenly spaced or the intervals between reference points may vary (e.g., within a rotation) and the number of reference points may be more or less than 12. The data collected from the magnetometer 250 may be used to calibrate the scale of the gyroscope 240 as described in detail herein. The RAA 200, for example, may be programmed to perform a number of rotations after (e.g., immediately after) the RAA 200 has left the docking/charging station 300. In addition to or in lieu of rotations immediately after the RAA 200 has left the docking/charging station 300, rotations may be performed as part of the normal movement of the RAA 200 (vacuuming motions of an RVC, for example). The magnetometer 250 may be calibrated or uncalibrated prior to performing the rotations from which data is collected to determine the scale of the gyroscope 240.

If the magnetometer 250 is calibrated (e.g., perfectly calibrated) and the magnetic measurements (e.g., all of the magnetic measurements) are taken in an ideal, unchanging magnetic field, at all points in a rotation, the magnetometer 250 will measure the same magnitude and a different orientation for the magnetic field (e.g., as projected onto the horizontal plane) forming a circle (e.g., an approximate circle) as illustrated in FIG. 4A. In more realistic conditions, the measurements may look rather like that shown in FIG. 5A. By way of comparison, if conditions are poor (e.g., significant changes in the surrounding magnetic field), the magnetometer readings may realistically be as shown in FIG. 6A. For example, the conditions can become worse because of magnetic field fluctuations/changes due to, for example, electromagnetic activity in the area such as current carrying conductors and/or large metallic (e.g., ferromagnetic materials) near or adjacent to the RAA 200.

In certain representative embodiments, at least the first rotation of the N+1 rotations of the RAA 200 may be used to find the M reference points for magnetic fields (e.g., for measurement of the magnetic fields). The subsequent N turns may be used to collect data to be used to determine (calibrate) the scale (i.e., scale factor or scale correction) of the gyroscope 240. For example, after the RAA 200 is determined to be or detected to be rotating at a constant rate, gyroscope integration may be started to provide heading angles. Even though the scale of the gyroscope is not determined yet, whether the rotation rate is constant may (e.g., may still) be determined accurately. Data for M (e.g., M=12) reference points 1-12 may be recorded. The data may include a 2-tuple (e.g., a 2-tuple for each reference point) including a heading angle (as determined from the gyroscope integration data) and a 3D magnetic field vector (as determined from the magnetometer output data). Each reference point may be assigned an index, e.g., reference point index 1 through 12.

For the next N rotations, the gyroscope scale may be calibrated based on the data collected. For example, on condition that the output of the magnetometer 250 matches (e.g., for example, one time, multiple times or every time the output of the magnetometer 250 matches) the magnetometer vector of one of the reference points (indicating, in theory, that the RAA 200 is at the same heading (i.e., angular orientation) as the corresponding reference point 1-12), the 2-tuple recorded at that point may be used to update the gyroscope scale estimate.

There are many ways to determine when the RAA 200 has reached the point closest to the same heading as one of the reference points 1-12. In certain representative embodiments, to determine when the RAA 200 has reached a closest heading to a given reference point 1-12, the 2-tuples may be sampled from the output of the magnetometer 250 and the output of the gyroscope 240 at a relatively high rate, e.g., in a range of several hundred to a thousand times per 360° rotation. When a sampled reading of the output of the magnetometer 250 is within a particular threshold of one of the reference points 1-12, the 2-tuple may be used to calculate the gyroscope scale. As the RAA 200 continues to rotate, if a sampled reading of the magnetometer 250 is recorded that is closer to that reference point 1-12, the gyroscope scale may be updated (e.g., updated again) using that latest 2-tuple data.

In certain representative embodiments, instead of using (e.g., immediately using) a 2-tuple (e.g., every 2-tuple) that is less than the threshold to update the gyroscope scale, the 2-tuples (e.g., all of the 2-tuples) within the threshold may be saved (e.g., temporarily saved) until the RAA 200 determines the 2-tuple for which the sampled reading of the magnetometer 250 is closest to the reference point 1-12 (e.g., and may use (e.g., may only use) that one sampled reading to update the gyroscope scale). Because the calculation of the gyroscope scale may be a relatively low cost calculation, and saving those 2-tuples may require or may use memory 230, overall, the gyroscope's scale may be calculated for 2-tuples (e.g., each 2-tuple) that are within the threshold, for example, in lieu of saving multiple 2-tuples within the threshold and determining which one has the closest sampled reading of the magnetometer 250.

In certain representative embodiments, the RAA 200 may use a set of the closest sampled readings to interpolate to estimate the reading of the magnetometer 250 at the particular reference point 1-12. The interpolation may use a linear or a non-linear interpolation operation.

As previously mentioned, the reference points 1-12 may be assigned indices and the processing algorithm may keep track of the index of the reference point 1-12 that is being considered at that moment (e.g., at each moment). The operation may start with a setting of a counter to an index of the first reference point, e.g., 1, after (e.g., immediately after) a last of the M reference points has been established during the initial rotation The counter may remain at a current index value (e.g., 1) until the sampled reading of the magnetometer 250 of the currently sampled 2 tuple becomes closer to the magnetometer reading corresponding to the next reference point (e.g., reference point 2) than to the current reference point (e.g., reference point 1). At that point, the index (e.g., index=1) may be updated to the next value (e.g., index=2).

Some or all of the M reference points (e.g., reference points 1-12) may be used as references to calculate the M gyroscope scale estimates, respectively. After the N+1 rotations are completed, the M gyroscope scale estimates (e.g., one for each of the M reference points (e.g., reference points 1-12), with each of those M estimates being based on N 2-tuples) may be averaged to obtain a single gyroscope scale estimate.

In certain representative embodiments, if a repeatability of the magnetometer 250 is $\Delta\theta$ degree, a gain accuracy of the gyroscope 240 may be as set forth in Equation 1, as follows:

$$\frac{\Delta\theta \cdot \pi/180}{2\pi N} = \left(\frac{\Delta\theta}{3.6N}\right)\% \quad (1)$$

where: N is the number of rotations, and $\Delta\theta$ is the magnetometer repeatability factor. As reflected in Equation 1, gyroscope gain estimate accuracy may improve with both an increase in the number of rotations N, and a decrease in the magnetometer repeatability/accuracy factor $\Delta\theta$ (for example a decrease in the magnetometer repeatability/accuracy factor $\Delta\theta$ may correlate to an improvement in repeatability/accuracy of the magnetometer readings).

Table 1 below illustrates the gain accuracy of a gyroscope 240 as a function of the number of rotations and magnetic field repeatability according to Equation 1. The magnetometer repeatability may depend on (e.g., more on) the magnetic environment than on measurement noise, as low pass filtering may significantly remove the noise. Experiments have shown that a magnetometer repeatability factor $\Delta\theta$, of about 1.5° is near the top end of what may be practically achievable in the real world, that about 2.8° may be more typical, but that a bad real world magnetic field may be as bad as 17° or worse.

The gyroscope gain estimate accuracy may improve with an increasing number of sample points M. For example, averaging over M reference points may reduce (e.g., may further reduce) the gain error by about $\sqrt{M}$.

For a typical magnetometer field repeatability of about 2.8°, an accuracy of 0.25% or greater in the gyroscope gain estimate may be achieved most of the time using the techniques and/or procedures disclosed herein with about 3 to 4 rotations/spins of the RAA 200 (e.g., N=3 to 4) and, for example 12 reference points (e.g., M=12).

FIGS. 4B, 5B, and 6B illustrate a convergence of gyroscope scale to the correct value of 0.99 as a function of number of rotations. An accuracy error of 0.25% may be achieved even if the magnetometer measurements are not well calibrated, such as in the third environment of FIG. 6B.

TABLE 1

|  | N + 1 = 2 | N + 1 = 3 | N + 1 = 4 | N + 1 = 5 | N + 1 = 6 |
| --- | --- | --- | --- | --- | --- |
| $\Delta\theta = 1°$ | 0.28% | 0.14% | 0.09% | 0.07% | 0.06% |
| $\Delta\theta = 2°$ | 0.56% | 0.28% | 0.19% | 0.14% | 0.11% |
| $\Delta\theta = 3°$ | 0.83% | 0.42% | 0.28% | 0.21% | 0.17% |
| $\Delta\theta = 5°$ | 1.39% | 0.69% | 0.46% | 0.35% | 0.28% |
| $\Delta\theta = 15°$ | 4.17% | 2.08% | 1.39% | 1.04% | 0.83% |

The error sources affecting accuracy may include any of: (1) magnetic field interference, (2) measurement noise, (3) delay between magnetometer and gyroscope data, (4) rotation not exactly around the desired axis, (e.g., the z axis using the RAA 200 example), and/or (5) magnetic field changes when rotating, caused, for instance, by horizontal translation of the RAA 200 on the floor while rotating, among others.

Gain calibration accuracy may generally improve with (1) the number of rotations, and/or (2) the number of reference points per rotation. FIGS. 4B, 5B and 6B illustrate convergence of the operation and/or algorithm to a gain calibration accuracy of about 0.99.

Figure 7:
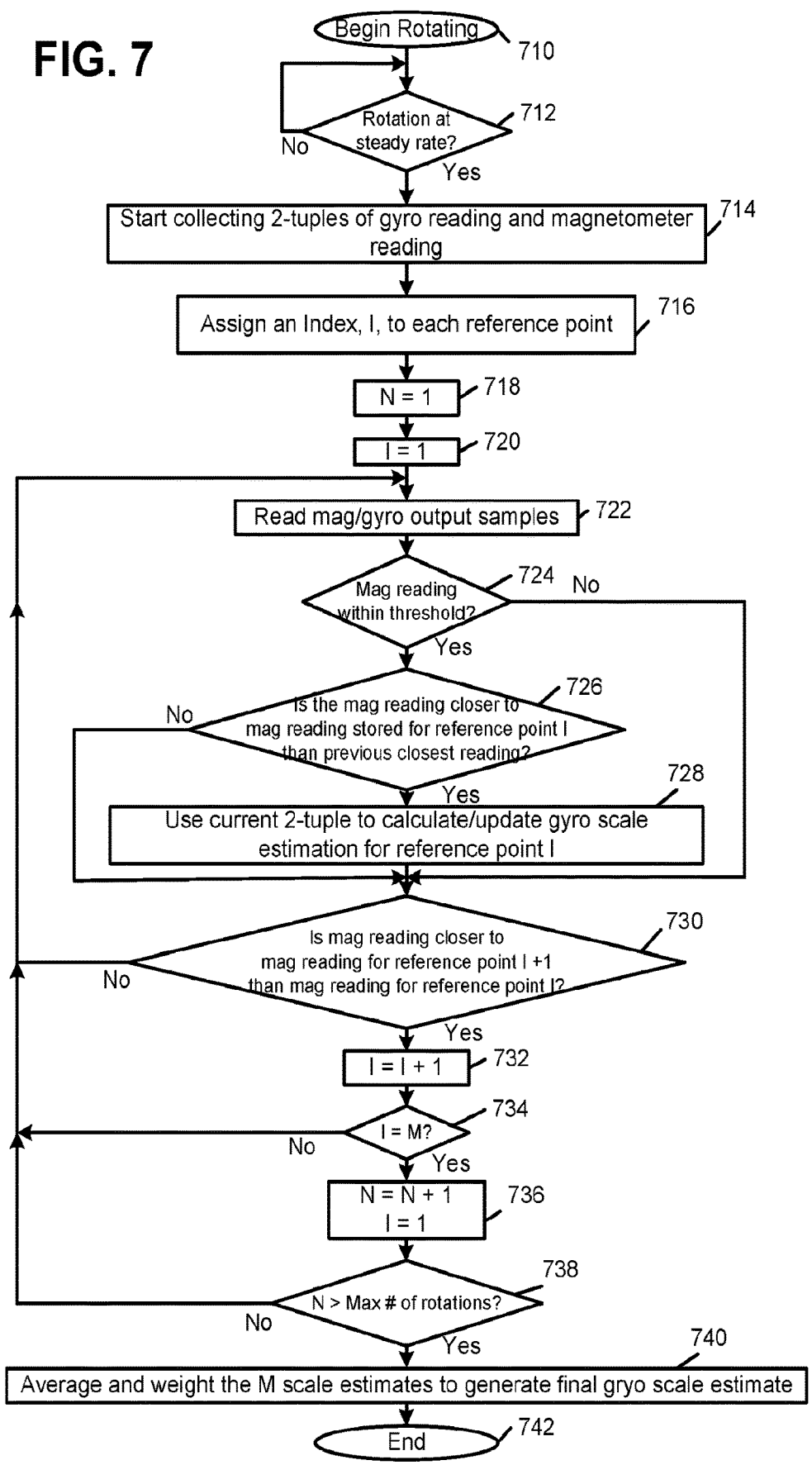
FIG. 7 is a flow diagram illustrating a representative calibration procedure using a magnetometer.

FIG. 7 is a flow diagram illustrating a representative calibration procedure that may be implemented by the control unit 215 and/or a processor employing software, hardware and/or combinations thereof. At operation 710, the RAA 200 (e.g., such as a RVC) may be instructed to begin rotating about an axis (for example as stationary as possible, and in the case of the RVC, for example vertical, e.g., not tilted). On condition that and/or once the rotation is determined to be at a steady rate at operation 712, at operation 714, the RAA 200 may start to collect 2-tuples of (1) angular heading (e.g., from the integration of the gyroscope output) and (2) magnetic vector readings (e.g., from the magnetometer).

In certain representative embodiments, a calibration procedure may be triggered based on a determined location or vicinity to the docketing/charging station 300. For example, the calibration procedure may be triggered: (1) after the RAA 200 is switched on, (2) prior to or just after the RAA 200 leaves the docketing/charging station 300 and/or (3) just prior to or just after the RAA 200 returns to the docketing/charging station 300.

At operation 716, the RAA 200 may assign an index to each reference point. At operation 718, the RAA 200 may set a rotation counter to N=1 to start counting rotations after the data for the M reference points is collected. At operation 720, the RAA 200 may assign an index, I, to each reference point. At operation 722, the RAA 200 may start taking and/or sampling reading from the magnetometer 250 and gyroscope 240 (e.g., as 2-tuples) at a rate higher than (e.g., substantially higher than) M samples per full rotation. For example, the rate of sampling may be at least a threshold more than M. At operation 724, the RAA 200 may determine if the output of the magnetometer 250 is within a predetermined threshold of the magnetic vector stored for reference point I. If so, the flow may proceed to operation 726, and the RAA 200 may determine if the current reading of the magnetometer 250 is closer to the magnetic vector of the current reference point than the previous closest reading of the magnetometer 250 since the threshold was met (which may be true (e.g., which always be true) for the first reading of the magnetometer 250 that is within the threshold). Although not shown explicitly in FIG. 7, the determination may, be done by storing the closest sample, comparing the current sample to the previously stored closest sample, and updating the stored closest sample whenever a closer sample is received.

When both the condition at operation 724 and the condition at operation 726 are met, the flow may proceed to operation 728, and the 2-tuple of angle and magnetic vector may be used to update the gyroscope scale factor (sometimes referred to as ScaleCorrection) for reference point I. If at operation 726 the current reading of the magnetometer 250 is not determined to be closer to the magnetic vector corresponding to the current reference point I than the previous reading, the flow may skip over operation 728 such that the sample is not used to update the gyroscope scale estimate.

Returning to operation 724, if the reading of the magnetometer 250 is not within the threshold, flow may skip from operation 724, over operation 726 and 728 and may flow to operation 730 (e.g., directly to operation 730.

At operation 730, the RAA 200 may determine if the current reading of the magnetometer 250 is closer to the magnetic vector corresponding to the next reference point I+1 than to the magnetic vector corresponding to the current reference point I. If the current reading of the magnetometer 250 is not closer to the magnetic vector corresponding to the next reference point I+1 than to the magnetic vector corresponding to the current reference point I, the flow may proceed to operation 722, for example to read and process the next 2-tuple sample to determine if the next 2-tuple sample is closer than the last 2-tuple sample in accordance with operations 722 through 728. If the current reading of the magnetometer 250 is closer to the magnetic vector corresponding to the next reference point I+1 than to the magnetic vector corresponding to the current reference point I, the flow may proceed to operation 732, and the index I may be updated to I+1 to start working on the next reference point.

At operation 734, the RAA 200 may determine if the index I has reached M (indicating that a full 360° rotation has been completed). If the index I has not reached M, the flow may proceed to operation 722 to take the next sample (e.g., which maybe compared to the next reference point). If the index I has reached M (e.g., indicating that a full rotation has been completed), the flow may proceed to operation 736, and N may be incremented (e.g., indicating that a 360° rotation has been completed and the next 360° rotation has started) and I may be reset to 1 (for example, to return to collecting data for the first reference point). At operation 738, the RAA 200 may determine if N (which indicates the number of rotations completed since the first rotation (e.g., the reference point gathering rotation) has reached the predetermined number of complete rotations (e.g., 12 rotations). If the number of rotations completed since the first rotation has not reached the predetermined number of complete rotations, the flow may return to operation 722 to take the next sample. If the number of rotations completed since the first rotation has reached the predetermined number of complete rotations, all of the data may have been collected and processing may proceed to operation 740, and the scales estimated for each of the M reference points may be averaged and/or weighted to generate a final gyroscope scale estimate.

In certain representative embodiments, some or all of the M scale estimates may be assigned a weight based on the quality of the data corresponding to that reference point. The quality of the data may be determined, for instance, based on any of the criteria mentioned above for use in determining which, if any, samples to discard. For example, the quality of the data may correspond to the number of magnetometer samples that are properly matched to a reference point (e.g., within a threshold of the reference point) At operation 742, processing may end.

Additional error sources that may affect the accuracy of the gyroscope scale estimate include undesired translation of the RAA 200 in a plane perpendicular to the axis of measurement during the N+1 rotations (e.g., horizontal translation of the RAA 200). For instance, it has been found that, while current commercially available RVCs remain reasonably stationary while rotating on a hard surface (e.g., a hardwood floor), the RVCs may tend to translate (commonly referred to as "walk") during such rotation operations when on a softer surface, such as carpet. Such walking may cause undesired changes to the magnetic field measured by the magnetometer 250. One potential solution to address this issue is to design the RVC and the docking station so that the N+1 rotations can be performed while the RVC is in the docking station.

In certain representative embodiments, the N rotations after the first rotation may be split into a first set of rotations in one direction (e.g., clockwise) and a second set of rotations in the opposite direction (e.g., counterclockwise). In these embodiments, the RAA 200 may tend to continue to walk in the same general direction regardless of a reversal of the rotation direction. However, if the magnetic field gradient over the course of the horizontal translation of the RAA 200 is relatively uniform, the errors in each of the two sets of rotations may tend to cancel each other out.

In other representative embodiments, rather than selecting a particular number of reference points, M, the RAA 200 based on an algorithm may use every measurement point. For instance, during the first rotation, every 2-tuple may be stored, and during the N subsequent rotations, a sampled 2-tuple (e.g., each measurement 2-tuple) may be matched to a reference 2-tuple based on a closest reading of the magnetometer 250 (e.g., a smallest distance in terms of a magnetometer XY magnetic field reading, a magnetometer XYZ magnetic field reading, and/or an angular distance in polar coordinates, among others). This may increase (e.g., may significantly increase) processing load and memory requirements. Empirical observations appear to reveal no appreciable improvement in accuracy from using all available samples as opposed to, for example, a small number of reference points, e.g., M=6 to 12 reference points.

In certain representative embodiments, accuracy may be improved by not using samples that have certain characteristics that are indicative of magnetic field change. For instance, if the matching sample for a given reference point (e.g., the sample taken during the second to N+1th rotation that is closest as a function of distance between the magnetometer output corresponding to the corresponding reference point and magnetometer output for the sample) has a relatively large matching error as compared to most other matching samples, that sample may be discarded, rather than be used to update the scale estimate. In certain representative embodiments, a threshold based on a number of standard deviations, for example in the range of about 1 to 3 standard deviations or of 2 standard deviations, may be set to determine whether to use or discard a matching sample.

Another possible criterion to discard matching samples may be to discard all the data in a complete rotation if a center of the magnetic circle for that rotation as shown in FIGS. 4A, 5A and 6A is offset by an amount greater than a predetermined threshold from the center of a reference circle. Another criterion to discard one or more samples of a complete rotation may be based on a shape traced by the magnetic field readings during the complete rotation or part of the complete rotation. For instance, if the shape is too far from a circle, the data for the complete (e.g., the entire) rotation may be discarded or if a portion of the shape is too far from that portion of the circle, the data for that portion of the complete rotation may be discarded.

A further criterion to discard one or more samples is to compare the shape of the 2D projection of the magnetic field during the reference rotation, to the shape of the subsequent rotations. Any shape similarity metric may be used (for example such that the similarity metric is greater than or less than a threshold value). One representative metric may be to compute the non-overlapping area of the two shapes. A second metric may be to first compute the non-overlapping area of the two shapes and then normalize the result by the average area of the two shapes. A further criterion to discard one or more samples of a complete rotation may be based on the amplitude of the magnetic vectors. For example, if the amplitude of the measured magnetic field differs from the amplitude of the corresponding reference point's magnetic field by greater than a threshold amount, the sample may be discarded. It is contemplated that the center of the circle of the magnetic vector measurements may be offset from zero, if the center of the circle of the magnetic vector measurements is offset from zero, the amplitude may be measured from the center of the circle rather than true zero. In some representative embodiments, in which unreliable samples may be discarded, the RAA 200 may be controlled to rotate N times, and only those ones of the N rotations that meet one or more of the aforementioned criteria may be used in computing the gyroscope scale factor. In certain representative embodiments, the RAA 200 may be controlled to continue to rotate until N "good" rotations (e.g., N rotations that meet the one or more criteria) have been completed.

In certain representative embodiments, magnetometer repeatability (e.g., only magnetometer repeatability) may be used for calibration of the gyroscope scale factor.

In certain representative embodiments, magnetometer points may be used while the RAA 200 is rotating, (e.g., in lieu of or in addition to stable points in which the measurements are taken after stopping to rotation of the RAA 200), as the same stable points (e.g., within a threshold tolerance) for different rotations of the RAA 200 may or may not be achievable.

In certain representative embodiments, a filter may be applied to one or both of samples/reading of the gyroscope 240 and the samples/readings of the magnetometer 250, for example to reduce noise. For example, the applied filter may include (1) an Infinite Impulse Response (IIR) filter and/or (2) a Finite Impulse Response (FIR) filter, among others, for example to reduce noise.

In certain representative embodiments, the same filters may be used to keep the delay associated with the samples/readings of the gyroscope 240 and the samples/readings of the magnetometer 250 the same.

Tilt, e.g., which refers to any component of rotation that is not around the axis about which the rotation is set, intended, or believed to be occurring, may reduce the accuracy of the gyroscope scale estimate.

Continuing with the RAA 200 example, the intended axis of rotation may be a vertical axis, e.g., the axis of gravity, which, may be the z-axis of the sensors. The tilt error may be the result of, for example, two causes. First, the supporting surface (e.g., the floor) may be tilted (e.g., the floor may not be perpendicular to gravity). In the body frame of the sensor package 235 or one or more of the sensors 240, 250 and/or 260 (e.g., the frame of reference of the magnetometer 250 and/or the gyroscope 240), the ideal output of the magnetometer 250 may still be a circle in the plane perpendicular to their vertical axis, just a different circle from the case without tilt. Since such embodiments rely (e.g., only rely) on magnetometer repeatability, there should be no extra error caused by any magnetometer field change resulting from, for example floor tilt. Since the rotation axis of the RAA 200 may still be the same as a z axis of one or more sensors 240, 250 and/or 260 (although it may not be vertical anymore), the gyroscope 240 may still show rotation in its z axis. These embodiments described above may be immune to this first type of tilt.

Second, the sensor package 235 and/or one or more sensors, e.g., the magnetometer 250 and/or the gyroscope 240) may be mounted in the RAA 200 at a slight tilt from the presumed vertical axis of the RAA 200 (commonly referred to as circuit board tilt or just board tilt). The axis of rotation may be the vertical axis of the RAA 200 (e.g., corresponding to the z axis). Measured in the body frame of the gyroscope 240, the angular velocity may not be along the vertical axis of the sensors 240, 250 and/or 260 anymore due to the tilt.

If the vertical axis of the gyroscope 240 is the u direction, it is contemplated that the u direction may be the vertical axis of the magnetometer 250 also, for a magnetometer 250 that is accurately mounted on the same board as the gyroscope 240. The rotation that the sensors (e.g., the magnetometer 250 and/or the gyroscope 240) experience may not solely be about their vertical axes, but also may be about their x and/or y axes. Regular gyroscope integration along the sensors' z axis may lose the rotation energy in the x and y axes, and may result in an error in the heading change calculated via gyroscope integration.

One way to compensate for any difference between z and u may be to measure the tilt, adjust the readings from the sensors to undo and/or compensate for the tilt (e.g., by removing the effect of the tilt via eliminate any component of rotation around the x and y axes from the measured values), and perform the updating of the gyroscope scale using the adjusted readings. In certain representative embodiments, if the sensor package 235 or a sensor board includes an accelerometer 260 and dynamically determines a zero-gravity offset (ZGO) of the accelerometer 260, tilt may be based on and/or obtained from the dynamic ZGO calibration.

In certain representative embodiments, a first order approximation of gyroscope integration may be obtained by taking the norm of the angular velocity measured by the gyroscope 240 in the direction u as the angular velocity in z.

Any delay between the taking of the reading of the magnetometer 250 and the taking of the reading of the gyroscope 240 may degrade the accuracy of the scale estimate (due to the reading of the magnetometer 250 being taken at a different angle of orientation than the reading of the gyroscope 240 because of the delay). One way to address this potential source of error is to stop the RAA 200 at a portion of the reference points, or each reference point before taking the 2-tuple measurements. This may guarantee for those reference point where the RAA 200 is stopped such that the two measurements are taken with the RAA 200 at the same angular orientation. It may not be feasible to stop at the exact same angle as the reference points, since the gain of the gyroscope 240 is not accurate (and that is why the gyroscope 240 is being dynamically calibrated). The changing currents and electromagnetic fields resulting from starting and stopping the motor that rotates the RAA 200 may cause (e.g., actually cause) more interference and/or noise in the readings from the magnetometer 250. The representative procedures described above of taking measurements frequently and determining which 2 tuples of measurements is the one closest to a reference point may provide an accurate matching (e.g., very accurate matching, for example within a threshold level) of angular orientation of the measurement samples to the reference points.

Although the representative embodiments associated with at least FIGS. 2-3, 4A, 4B, 5A, 5B, 6A, 6B and 7 are illustrated using a RAA, it is contemplated that any other device (e.g., robotic and/or non-robotic) which includes a gyroscope and a magnetometer may implement these embodiments. For example, an Inertial Measurement unit (IMU), a Timing & IMUs (TIMU), a mobile device, a head mounted display, a WTRU and/or smartphones, among others may implement such embodiments.

Representative Gyroscope Scale Calibration Procedures Based on Angular Position of a Device For proper performance of an IMU, a Timing & IMUs (TIMU), and other devices that include a gyroscope including, for example, a mobile device, a head mounted display, a WTRU and/or smartphones, among others, it may be appropriate to have a calibrated device. For a device that moves predominantly in a plane (e.g., a single plane such as a robot that may move around the floor), the gyroscope associated with the device may have a plurality of parameters (e.g., two key parameters) that may need to be or are to be calibrated. One parameter to be calibrated may be the Z-axis (i.e., parallel to gravity) zero-rate offset (ZRO), and the other parameter to be calibrated may be the Z-axis scale (also referred to as the 'gain' and/or the 'sensitivity').

A linear 1-axis calibration equation is set forth in Equation 2 as follows:

$$G_{calib} = S^*(G_{uncal} + O) \quad (2)$$

where: $G_{calib}$ is the calibrated gyroscope output; S is the gyroscope scale; $G_{uncal}$ is the uncalibrated gyroscope input; and O is the gyroscope zero-rate offset (ZRO).

In certain representative embodiments, methods, procedures, apparatus, and/or devices may be implemented to dynamically calibrate a ZRO.

In other representative embodiments, methods, procedures, apparatus, and/or devices may be implemented to calibrate a gyroscope scale, for example without additional information and/or constraints. A gyroscope scale may be calibrated in a factory setting by rotating the gyroscope on a turntable that may move at a pre-determined or measured rate of speed. The calibration procedure may include any of the following:

(1) calibrate ZRO by having the device stationary, and measure the uncalibrated gyroscope value at rest, $G_{rest}$, and compute $O = -G_{rest}$;

(2) spin/move the gyroscope at a constant rate $G_{truth}$;

(3) measure the uncalibrated gyroscope value when in motion, $G_{motion}$; and/or (4) compute the scale: $S = G_{truth}/(G_{motion} + O)$.

The calibration may be done (e.g., completed) using or with a single measurement, by averaging multiple measurements, or by using multiple measurements and finding the scale that gives the smallest residual difference between $G_{truth}$ and $G_{calib}$.

A 1-axis gyroscope scale may be calibrated by gyroscope integration. A turntable may have inaccuracies associated with its angular velocity (e.g., rotational speed). For example, (1) the turntable may not be able to rotate at precisely a known speed, (2) may not have encoders or other means to measure the angular velocity of the turntable, and/or (3) may not have encoders or other means to measure the angular velocity of the turntable precisely, among others. If the turntable can stop at a known angular position (e.g., at a precisely known angular position, for example within a positional threshold), the gyroscope may be calibrated using the turntable, test fixture or other device that can set a known angular position (e.g., an angular displacement from an initial angular position). In this case, the gyroscope integration may be compared with the truth motion. The calibration procedure may include any of the following:

(1) calibrate ZRO by having the device stationary;

(2) measure the uncalibrated gyroscope value at rest, $G_{rest}$, and compute $O = -G_{rest}$;

(3) initialize the gyroscope integration position $P_{int} = 0$;

(4) rotate/move the device a precise amount $P_{truth}$;

(5) while the device is in motion, integrate all the gyroscope samples: $P_{int} = \Sigma(G_{unal} + O)^*\Delta T$; and/or (6) when the device is at rest, compute the scale:

(i) $\quad P_{truth} = \Sigma[S^*(G_{uncal} + O)]^*\Delta T = S\Sigma(G_{uncal} + O)^*\Delta T = S^*P_{int}$; and/or (ii) $S=P_{truth}/P_{int}$

Representative Alternative for Rotational Integration Calibration Procedures Since the motion of the gyroscope is around a constant axis, a linear integration of the gyroscope vector may be equivalent to rotational integration.

One example of the rotational integration may be Euler integration with small-angle approximation. For each angular velocity reading, any of the following may be executed:
(1) create/generate quaternion $\Delta q$ with the real term as 1, and the imaginary terms=$\omega*\Delta T/2$; and/or
(2) update the current angular position quaternion q=qmult(q, $\Delta q$) where qmult is quaternion multiplication.

where q is the current angular position and represented as a quaternion; $\omega$ is the nominally calibrated gyroscope reading: $\omega=S_{nom}*(G_{uncal}+O)$; $S_{nom}$ is the nominal scale, and $\Delta T$ is the sampling period.

One procedure that may use the rotational integration result may include to:
(1) convert both quaternions to Euler angles, and use the Yaw components of each, where;
(2) compute the scale correction $E=P_{truth}/(Y1-Y0)$; and/or
(3) compute the new scale calibration: $S=S_{nom}*E$,
where q0 be the initial angular position before the integration, and q1 be the final angular position after the integration; Y0 is the yaw of q0, and Y1 is the yaw of q1.

It is contemplated that the linear integration may handle rotations larger than 360° and for rotations of less than 360°, it is possible to use rotational integration.

Representative Calibration Accuracy

The accuracy of the gyroscope scale after turntable calibration may depend on the accuracy of the angle of the turntable's rotation during the calibration process. The gyroscope scale correction is set forth in Equation 3 as follows:

$$\text{ScaleCorrection}=\text{MeasuredRotation}/\text{ActualRotation} \quad (3)$$

If there are errors in the ActualRotation, the errors may lead to a proportional error in the calibrated ScaleCorrection. For example, if the attempted rotation is 180°, and there is a ±0.45° variation in the turntable position, the resulting calibration may be no better than 0.25% of the true calibration. If the turntable has a fixed amount of error, the scale error may be reduced, for example by increasing the amount of actual rotation. For example, the same ±0.45° variation with a 360° rotation may give 0.125% scale error.

Representative On-board Calibration Procedure

In a factory calibration configuration, it is contemplated to send raw data from the device (e.g., being calibration tested) to a calibration station that can control the turntable. The calibration station may start logging the data (e.g., the raw data), move the turntable, finish logging the data, compute the calibration, save the calibration, and/or send the calibration (e.g., a calibration record) to the device (e.g., being calibration tested). The connectivity to enable the logging of the sensor data and writing of the calibration data back to the device may be a burden to the implementation of the device, and may lead to a more complicated test/calibration station. In certain representative embodiments, the calibration may be executed (e.g., run) directly on the device (e.g., being calibration tested) or may be executed partially on the device (e.g., being calibration tested) and partially external to the device.

Figure 8:
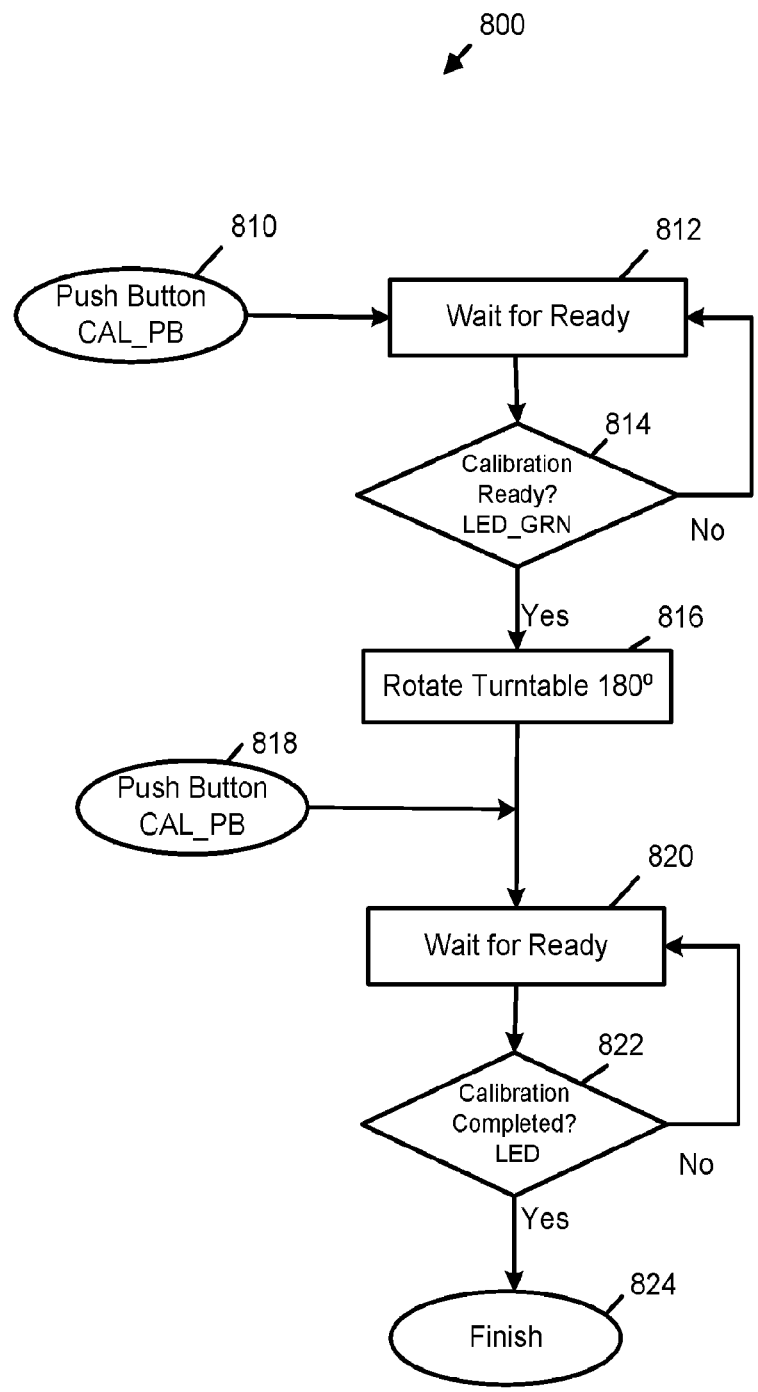
FIG. 8 is a diagram illustrating a representative calibration procedure.

FIG. 8 is a diagram illustrating a representative calibration procedure.

To implement a calibration internal to a device (e.g., such as a WTRU 102, a RAA 200, a IMU 210, or the like, hereafter sometimes referred to as device 910) without an external test/calibration station, the device 102, 200 and/or 210 may use a single input pin that may be connected to a switch (e.g., a push-button switch) to indicate the start and stop of the calibration, and two output LEDs, for example red and green LEDs, which may be used to indicate when the device 102, 200 and/or 210 may be moved (e.g., when it is appropriate to move the device 102, 200 and/or 210), and to indicate if the calibration was successful or unsuccessful.

Referring to FIG. 8, the representative calibration procedure 800 may include any of the following:
(1) place the device on the turntable and set the device to the starting position;
(2) at operation 810, press the calibration push button to indicate a start of the calibration;
(3) at operations 812 and 814, wait for the Green LED to light, to indicate that the device/system is ready for rotation;
(4) at operation 816, rotate/move the turntable 180°, and then leave the device at rest;
(5) at operation 818, press the calibration button to indicate the end of calibration; and/or
(6) at operation 820, wait for either the Green LED to indicate a success calibration, or the Red LED to indicate calibration failure.

Although the calibration procedure is disclosed to use a push-button switch, other types of switch are possible. For example, a toggle switch may be used and/or a switch that is activated by the positioning of a device 102, 200 and/or 210 under test (or for example device 910 in FIG. 9) adjacent to (e.g., in contact with) the calibration device (e.g., bar 920 in FIG. 9). It is also possible to avoid the need and/or use for the switch by detecting that the device is stationary by detecting a stable period in the gyroscope (e.g., gyroscope 240) and/or the accelerometer (e.g., accelerometer 260).

Although the calibration procedure is disclosed to use LEDs for a visual indication, other types of indications are possible. For example, an audio indication, a communication to another device a haptic indication may be used and/or a display or other presentation device may be used in lieu of or in addition to any other indication.

Although the calibration procedure is disclosed to use a 180° rotation, other rotation amounts are possible, as long as the rotation amount is known (e.g., preconfigured in the device under test).

Representative Procedures for Information Flow

A conventional calibration system has the following sources of data that are collected external to the device being calibrated in one external point to compute the calibration: (1) the 'truth' motion that describe the motion made by the device (e.g., via encoders on the turntable); and (2) the 'measured' motion from the device. After computing the calibration, the calibration result is to be written to the device. The results of the calibration may be logged for tracking of device performance. Any errors during the calibration may be logged and may be presented to the operator.

Using gyroscope integration calibration procedures according to certain representative embodiments described herein, the truth motion may be reduced from determining (e.g., knowing) the position of the turntable at every moment of time throughout the motion to determining (e.g., only knowing) the change in angle between a starting point and an ending point. If this amount is fixed, the truth may be computed, and does not need to be transmitted. If the calibration is performed on the device, it may not be appropriate and/or necessary to send sensor data out of the device and/or to write the calibration record back to the device. Even when the calibration is done in the device, it may be useful to be able to query the computed calibration record from the device, and/or be able to know which errors occurred in the previous calibration.

Representative Calibration Procedures with Support (e.g., Automatic) for Different Rotation Amounts On-board calibration may support different amounts of rotations, for example, without needing or using additional (e.g., any additional) inputs. For example, the calibration procedure may round a measured rotation to a nearest Q degrees, where Q is a large angle (e.g., 45°, 90° and/or 180°, among others) and use the measured rotation, as the true rotation. It is contemplated that when uncalibrated, the device may follow the Constraint 3 that:

$$\text{ScaleError} * Q * \text{TotalRotations} < Q/2 \quad (4)$$

in which a bounded error (i.e., ScaleError*Q*TotalRotations) may be less than Q/2. Here ScaleError is the percentage error, and TotalRotations is the number of Q degree rotations being measured. For example, if Q=45° and TotalRotations=5, then the uncalibrated scale error may be or may need to be less than 10%.

Representative Bar Calibration Procedures

Creating a turntable that can accurately, precisely, and repeatability stop at exactly 180° may be possible and may include some engineering challenges.

Figure 9:
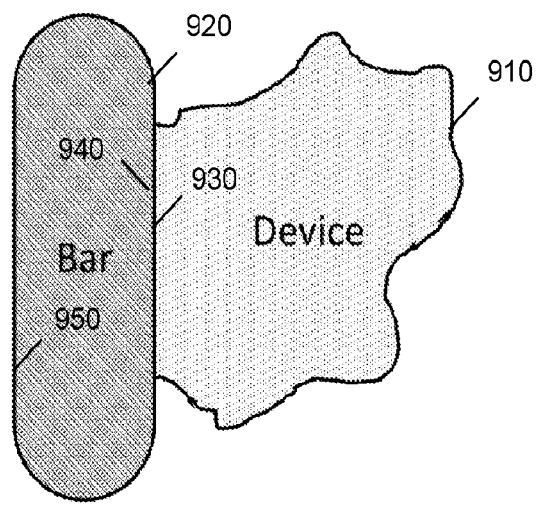
FIG. 9 is a diagram illustrating another representative calibration procedure.
Figure 10:
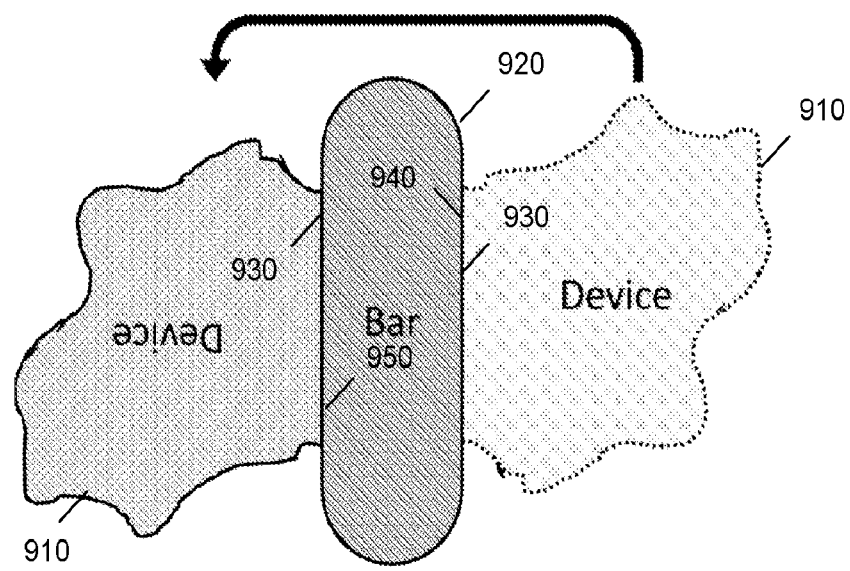
FIG. 10 is a diagram illustrating the representative calibration procedure of FIG. 9 for a device rotated relative to a starting angular position using a calibration device.

FIG. 9 is a diagram illustrating another calibration procedure for a device 910 (e.g., a device to be calibrated such as a IMU, WTRU, robotic device, and/or robotic vacuum, among others) using a bar 920. FIG. 10 is a diagram illustrating the calibration procedure for the device 910 rotated 180° relative to a starting angular position using an opposite side of a bar 920.

Referring to FIGS. 9 and 10, the calibration procedure may provide a precise 180° rotation. The device 910 may include: (1) a flat bottom (and/or points on the bottom that make contact with another surface (e.g., a support surface) (not shown) to ensure that the device is not tilted); and (2) at least one flat side 930 that make contact with (and/or is adjacent to) a side surface 940 of the bar 920, for example such that the side surface 930 of the device 910 and the side surface 940 of the bar 920 may form a consistent contact surface. The consistent contact surface, for example can ensure precisely known and repeatable angular positions (e.g., within a threshold tolerance for an angular position of 0° as the starting position and an angular position of 180° that is relative to the starting position) for the device 910.

The bar 920 may be placed on the flat support surface (e.g., flat table) (not shown). The bar 920 may have two sides (e.g., contact surfaces) that may form two parallel surfaces and that may match to and/or mate with the flat surface of the device to ensure that the device 910 is not tilted and is able to be positioned at precisely known angular positions (at any of: an angular position of 0° as the starting position or an angular position of 180° that is relative to the starting position).

A first calibration measurement may be taken from an output of the gyroscope when the device 910 is positioned at the starting position.

The side 930 of the device 910 may be held against the side 940 of the bar 920 for the start of the procedure as shown in FIG. 9. The device 910 may be slid and/or moved (e.g., manually or via a motorized or robotic operation) to a position on another side 950 of the bar 920 on the support surface. The device 910 may be hold against the other side 950 of bar 920 for the end of the procedure as shown in FIG. 10.

A second calibration measurement may be taken from an output of the gyroscope when the device 910 is positioned at the other side 950 of the bar 920. The gyroscope scale correction may be computed. In certain representative embodiments, an indication (e.g., visual and/or audio indication, among others) may be provided when the scale correction does not exceed a threshold percentage and/or a second indication (e.g., visual and/or audio indication, among others) may be provided when the scale correction exceeds a threshold percentage. In other representative embodiments, the indication may be accompanied by calibration information under certain conditions. For example: (1) if the calibration test is failed, calibration data may be exported from the device to a collection and/or storage device for further evaluation; and/or (2) the calibration test is passed, the calibration data and/or a calibration record may be exported from the device to store the calibration data and/or calibration record.

In certain representative embodiments, the device 910 or the bar 920 may have more than one flat side surface, for example, to enable calibration measurements to be taken from known angular positions for the device 910 in any of a full range of angular positions from 0° to 360°.

In certain representative embodiments, the device 910 and/or the bar 920 may have a holding device (not shown) to hold the device 910 against the bar 920. The holding device may use pressure suction, a clip, and/or a quick release, among others.

Figure 11:
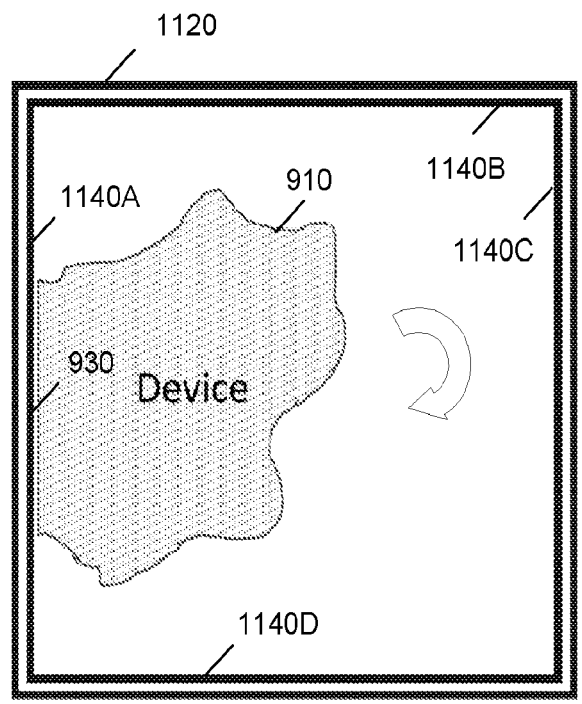
FIG. 11 is a diagram illustrating a further representative calibration procedure for a device using the inside surfaces of an N-side polygon calibration device.

FIG. 11 is a diagram illustrating a further representative calibration procedure for a device 910 using inside surfaces of an N-side polygon (where N=4) calibration device 1120.

Figure 12:
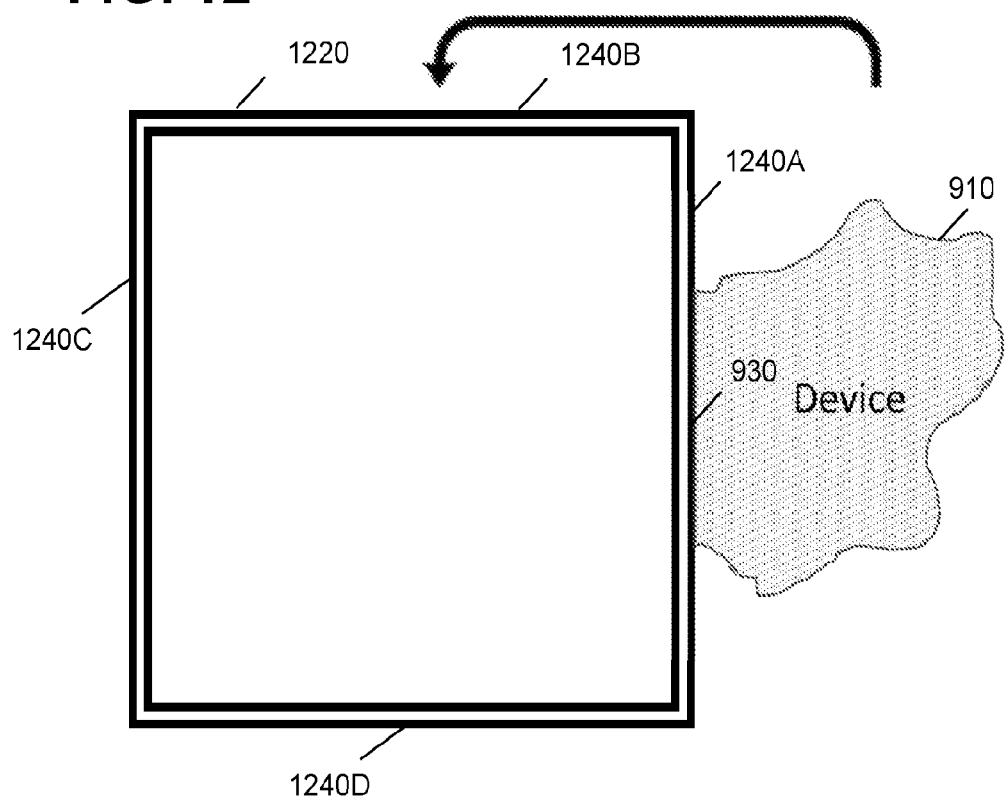
FIG. 12 is a diagram illustrating an additional representative calibration procedure for the device using the outside surfaces of the N-side polygon calibration device.

FIG. 12 is a diagram illustrating an additional representative calibration procedure for the device 910 using outside surfaces of the N-side polygon calibration device 1220.

Referring to FIGS. 11 and 12, the calibration procedure may provide any number of precise rotations. Similar to the calibration procedure in FIGS. 9 and 10, the device 910 may include: (1) a flat bottom (and/or points on the bottom that make contact with another surface (e.g., a support surface) (not shown) to ensure that the device 910 is not tilted); and (2) at least one flat side 930 that make contact with (and/or is adjacent to) a first side surface 1140A of an N-sided polygonal calibration device 1120 (where N is an integer number), for example such that the side surface 930 of the device 910 and the first side surface 1140A of an N-sided polygonal calibration device 1120 may form a consistent contact surface. The consistent contact surface, for example can ensure precisely known and repeatable angular positions for the device 910.

The N-sided polygonal calibration device 1120 may be placed on a flat support surface (e.g., flat table) (not shown). The N-sided polygonal calibration device 1120 may have four sides as shown in FIGS. 11 and 12. (e.g., four contact surfaces) that may match to and/or mate with the flat surface of the device 910 to ensure that the device 910 is not tilted and is able to be positioned at precisely known angular positions (at any of: an angular position of 0° as the starting position or an angular position that is relative to the starting position such as 0°, 90°, 180°, and/or 270° for a four sided rectangular calibration device).

A first calibration measurement may be taken from an output of the gyroscope when the device 910 is positioned at the starting position adjacent to the first side 1140A.

The side 930 of the device 910 may be held against the side 1140A for the start of the procedure as shown in FIG. 11. The device 910 may be slid and/or moved (e.g., manually or via a motorized or robotic operation) to a position on a second side 1140B on the support surface. The calibration procedure may be repeated for this second position adjacent 1140B and may be further repeated for further positions adjacent 1140C and 1140C.

The gyroscope scale correction may be computed taking for example differences between calibration measurements and using any number of these differences (and/or averaging these differences) to compute the scale correction. In certain representative embodiments, a visual and/or an audio indication may be provided when the scale correction does not exceed a threshold percentage and/or a second, different visual and/or audio indication may be provided when the scale correction exceeds the threshold percentage.

The calibration associated with N-sided calibration device 1220 is similar to that of the N-sided calibration device 1120 with the exception that the device 910 moves around an outside (e.g., instead of the inside of the N-sided calibration device) such that calibration measurements occur adjacent to any of: first to fourth sides 1240A, 1240B, 1240C and/or 1240D.

In certain representative embodiments, the device 910 and/or the N-sided polygonal calibration devices 1120 or 1220 may have a holding device (not shown).

Figure 13A:
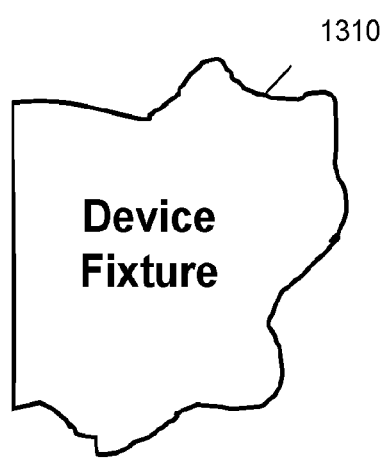
FIG. 13A is a diagram illustrating a top view of a device fixture.
Figure 13C:
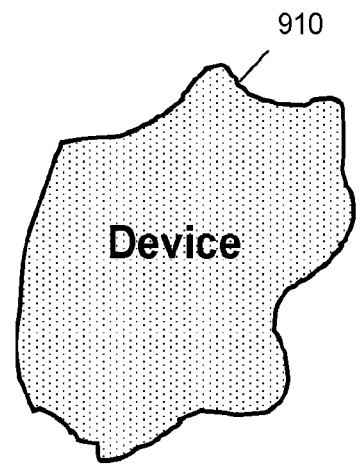
FIG. 13C is a diagram illustrating a top view of a test device.
Figure 13B:
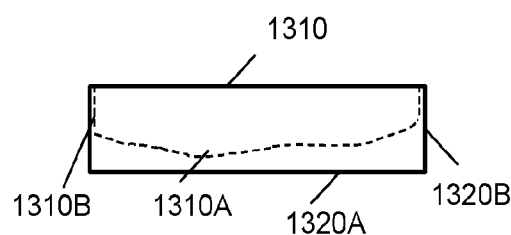
FIG. 13B is a diagram illustrating a side view of the device fixture of FIG. 13A.
Figure 13D:
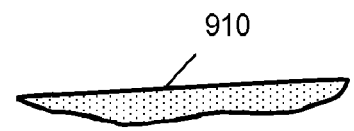
FIG. 13D is a diagram illustrating a side view of the test device.

FIG. 13A is a diagram illustrating a top view of a device fixture 1310. FIG. 13B is a diagram illustrating a side view of the device fixture 1310. FIG. 13C is a diagram illustrating a top view of the device 910. FIG. 13D is a diagram illustrating a side view of the device 910.

Referring to FIGS. 13A-13D, the calibration procedure may use a device fixture 1310 to provide any of: a flat bottom surface and/or one or more flat side surfaces, for example when the device 910 is irregularly shaped and/or has a continuous curvature, among others at shown in FIGS. 13C and 13D. The device fixture 1310 may include one or more bottom and/or side surfaces 1310A and 1310B (e.g., internal surfaces that may mate with (e.g., may include a complementary contour to the surfaces of the device 910) and may include a flat bottom surface 1320A and one or more flat side surfaces 1320B (e.g., external surfaces that may mate with (e.g., may include a complementary contour to the surfaces of the calibration device (e.g., the bar 920 and/or the N-sided polygonal calibration device 1120 or 1220) In such representative embodiments, the device 910 may be placed in the device fixture 1310 which may be used (e.g. placed) against the bar 920 or the N-sided polygonal calibration device 1120 or 1220.

These calibration techniques work because they maintain the constraints of having a rotation around the Z-axis of the device 910, and having an accurate (e.g., very accurate) true rotation of a known amount (e.g., 0°, 90°, 180°, and/or 270°, among others). The difference from a turntable is that the linear position of the axis of rotation may move, but linear position changes do not impact the measured angular velocity from a gyroscope.

Figure 14:
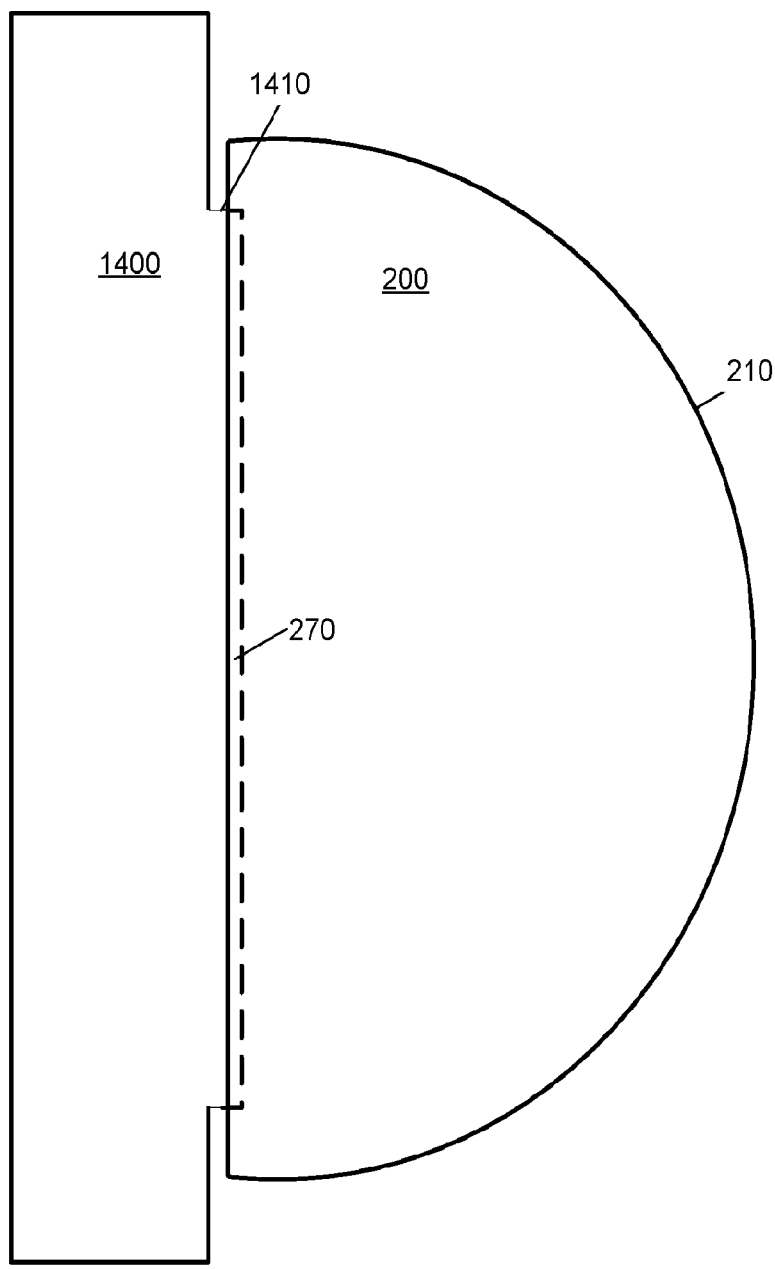
FIG. 14 is a diagram illustrating a docking operation to show another calibration procedure.

FIG. 14 is a diagram illustrating a docking operation to show another calibration procedure.

Referring to FIG. 14, the RAA 200 may be docked in docking/charging station 300 (e.g., with a fixed orientation for example based on the docking connector 295 of the RAA 200 coupling with (e.g., electrically or magnetically couple with) the docking connector 310 of the docking/charging station 300. When the RAA 200 is not in use, the RAA 200 may be docked at the docking/charging station 300 by navigating the RAA 200 to a fixed or predefined position. For example, the docking/charging station 300 and the RAA 200 may be shaped to properly align the RAA 200 with the docking/charging station 300, for example to ensure proper mating and/or to ensure a reliable and repeatable positioning (e.g., rotational positioning) of the RAA 200 (below a threshold rotational amount) sufficient for gyroscope scale calibration. The RAA 200 may undock from docking/charging station 300 and may rotate one or more predetermined times. The RAA 200 may redock with the docking/charging station 300. The RAA 200 by redocking in the same or substantially the same position in the docking/charging station 300 may be rotated a known amount (e.g., 360°, 720°, and/or Nx360°) for a determination of the gyroscope scale calibration estimate.

In certain representative embodiments, the RAA 200 may start an integration period on a condition that the RAA 200 is docked in the docking/charging station 300. The RAA 200 may read a gyroscope output at the start of the integration period. The RAA 200 may undock from the docking/charging station 300. The RAA 200 may rotate one or more predetermined rotations. The RAA 200 may redock with the docking/charging station 300. ending the integration period on a condition that the device is redocked in the docking station. The RAA 200 may read the gyroscope output at the end of the integration period and may estimate the gyroscope scale using the readings from the gyroscope output.

Other Representative Calibration Device Embodiments

In certain representative embodiments, an automatic turntable may be implemented. The device 910 may be mounted to the turntable, and a motor and motor control system may rotate the turntable a desired amount (e.g. via a stepper motor, or using one or more mechanical stops).

In certain representative embodiments, a manual turntable may be implemented. The device 910 may be mounted to the turntable which may have two or more stops that constrain the rotation.

In certain representative embodiments, the device 910 may have two or more flat sides. For example, the device 910 may have a first side and a second side with a known (e.g., accurate) angle between the first and second sides. The angle may be any known angle. For example, the device 910 may include two parallel sides. For calibration, the first side may be placed against a fixed edge for the starting position, and the second side may be placed against the same edge for the ending position.

In certain representative embodiments, the bar 920 may have two or more flat sides. For the bar calibration procedure, the bar 920 may be any shape that has a first flat side and a second flat side with a known angle between the first and second sides. The angle may be any known angle. For example, the device 910 may include one flat side. For calibration, the one flat side of the device 910 may be placed against a first side of the bar 920 for the starting position, and the one flat side of the device 910 may be placed against a second side of the bar 920 for the ending position.

In certain representative embodiments, the device 910 may have one flat side and the bar may include a single flat side. For the bar calibration procedure, if there is just one flat side, the one flat side of the device 910 may be placed against the single flat side (e.g., fixed edge) at the start position, and the device 910 may be rotated a multiple of 360° and the device placed against the single flat side (e.g., the fixed edge) again.

In certain representative embodiments, the device 910 may include executable code (e.g., a small amount of executable code) and RAM (e.g., a small amount of RAM) to implement the on-board calibration and may reduce or eliminate the use of an external test controller for such a calibration.

In certain representative embodiments, the device 910 may not communicate calibration samples out of a device, and may not writing the calibration records back to the device 910.

In certain representative embodiments, the device 910 may not use an encoder or other measurement on the turntable to measure the true rotation.

In certain representative embodiments, the bar calibration may not use a turntable, as the movement may be manually provided.

FIG. 15 is a flowchart of a representative method to estimate a gyroscope scale factor.

Referring to FIG. 15, the representative method 1500 may include, at block 1510, rotating the device 910 (or RAA 200) a plurality of rotations about an axis. At block 1520, the device 910, during the rotating of the device 910, may sample an output of the gyroscope 240 and an output of the magnetometer 250. At block 1530, the device 910 may determine from magnetometer readings, which of the samples from the magnetometer are within a first threshold and that have matching gyroscope headings based on an integration of the output of the gyroscope, as sample pair matches.

At block 1540, for each respective sample pair match, the device 910 may determine and/or update a composite gyroscope scale factor using the respective sample pair match. For example, the composite scale factor may be updated based on an integration of the gyroscope output over an interval from the time of the first magnetometer reading (or corresponding sampled gyroscope output) to the time of the second magnetometer reading (or corresponding sampled gyroscope output) of the respective sample pair match.

In certain representative embodiments, the device 910 may match a set of respective samples from the output of the gyroscope to a set of corresponding samples from the output of the magnetometer, for example to generate a plurality of sample pairs, each sample pair including a sampled output from the gyroscope and a corresponding reading from the magnetometer.

In certain representative embodiments, the determining of the matching gyroscope headings may include the device 910 determining a first gyroscope heading associated with a first magnetometer reading of a first sample pair and a second gyroscope heading associated with a second magnetometer reading of a second sample pair, on condition that the first and second magnetometer reading are within the first threshold.

In certain representative embodiments, the device 910 may determine that the first and second gyroscope heading match on condition that the first and second gyroscope headings are within a gyroscope heading threshold.

For example, the device 910 may determine from the plurality of sample pairs (e.g., 2-tuples), which of the sample pairs have readings of the magnetometer 250 that are within a threshold and that have matching gyroscope headings. These matching sample pairs (matching 2-tuples) may be referred to hereafter as sample pair matches. It is contemplated that such sample pair matches may occur when a magnetometer/gyroscope pair associated with one rotation of the device 910 and another magnetometer/gyroscope pair associated with another rotation of the device 910 have matching or substantially matching gyroscope headings and magnetometer readings.

In certain representative embodiments, the matching of the set of respective samples from the output of the gyroscope 240 to a set of corresponding samples from the output of the magnetometer 250 may include matching samples taken within a threshold period of time from the output of the magnetometer 250 and from the output of the gyroscope 240.

In certain representative embodiments, the sample pairs (e.g., each sample pair) may include sampling information associated with the sampled output of the gyroscope 240 and corresponding sampling information associated with the output of the magnetometer 250. For example, the closest samples in time sampled from the output of the gyroscope 240 and the magnetometer 250 may be paired (e.g., as a 2-tuple).

In certain representative embodiments, the matching of the set of respective samples from the output of the gyroscope 240 to a set of corresponding samples from the output of the magnetometer 250 may include matching samples taken within a threshold period of time from the output of the magnetometer 250 and from the output of the gyroscope 240.

In certain representative embodiments, the sample pair matches may include sample pairs that have a magnetometer output difference within the threshold and that have an associated gyroscope heading difference within another threshold.

In certain representative embodiments, the sample pair matches may exclude sample pairs that have a magnetometer output difference within the threshold and that have an associated gyroscope heading difference that exceeds another threshold.

In certain representative embodiments, the magnetometer/gyroscope pairs associated with one rotation of the device are a plurality of reference magnetometer/gyroscope pairs.

In certain representative embodiments, a reference magnetometer/gyroscope pair of the plurality of reference sample pairs may be matched with one or more magnetometer/gyroscope pairs from one or more other rotations of the device 910.

In certain representative embodiments, the magnetometer/gyroscope pairs associated with the one rotation may be taken at a predetermined number of angular positions within the one rotation.

In certain representative embodiments, the device 910 may sample the output of the magnetometer 250 and the output of the gyroscope 240 at a rate to have sample pair matches at the predetermined number of angular positions.

In certain representative embodiments, the device 910 may determine whether the output of the magnetometer 250 of a respective magnetometer/gyroscope pair is within the threshold of the output of the magnetometer 250 corresponding to the reference magnetometer/gyroscope pair and on condition that the output of the magnetometer 250 of the respective magnetometer/gyroscope pair is within the threshold of the output of the magnetometer 250 corresponding to the reference magnetometer/gyroscope pair, the device 910 may update an estimate of a component gyroscope scale for a reference point corresponding to the reference magnetometer/gyroscope pair, using the respective magnetometer/gyroscope pair.

In certain representative embodiments, for each respective subsequent magnetometer/gyroscope pair for which the output of the magnetometer 250 is closer to the output of the magnetometer 250 corresponding to the reference point, the device 910 may update the estimate of the component gyroscope scale for that reference point using the respective subsequent magnetometer/gyroscope pair.

In certain representative embodiments, the device may determine the magnetometer/gyroscope pairs by assigning an index to each reference point; setting a counter to the index corresponding to one of the reference points for which the output of the magnetometer 250 of a current sample pair is closest, for each subsequent magnetometer/gyroscope pair, determining whether the output of the magnetometer 250 is closer to the output of the magnetometer 250 from the current reference point or a next reference point; and/or on condition that the sampled output of the magnetometer 250 of a subsequent magnetometer/gyroscope pair is closer to the output from the magnetometer 250 corresponding to the next reference point than to the current reference point, incrementing the counter.

In certain representative embodiments, the device 910 may update the composite gyroscope scale factor using the respective sample pair match by: determining a component gyroscope scale factor for each gyroscope heading associated with the respective sample pair match; and/or generating the composite gyroscope scale factor by any of: averaging or weighing the component gyroscope scale estimates associated with different gyroscope headings.

In certain representative embodiments, the device 910 may compensate the output of the gyroscope 240 for any tilt between the axis of rotation of the device 910 and a sensing axis of the gyroscope 240.

In certain representative embodiments, the device 910 may compensate by determining a zero-gravity offset (ZGO) of an accelerometer 260 including a tilt angle between the accelerometer 260 and the device 910; and/or correcting the gyroscope output based on the tilt angle.

In certain representative embodiments, the device 910 may compensate by: determining a norm of an angular velocity detected by the gyroscope 240; and modifying the output of the gyroscope due to a tilt angle by using the norm as the z component of the angular velocity.

In certain representative embodiments, the rotating of the device 910 the plurality of rotations may include rotating the device 910 in a first direction a first portion of the plurality of rotations; and/or rotating the device 910 in a second direction a second portion of the plurality of rotations.

In certain representative embodiments, the sample pair match may include: (1) sampling information associated with a magnetometer reading of a first magnetometer/gyroscope pair; (2) sampling information associated with a sampled output of the gyroscope of the first magnetometer/gyroscope pair; (3) sample information associated with a magnetometer reading of a second magnetometer/gyroscope pair; and (4) sample information associated with a sampled output of the gyroscope of the second magnetometer/gyroscope pair. In other representative embodiments, the sample pair match may include (e.g., may only include): (1) sampling information associated with a first magnetometer reading; and (2) sample information associated with a second magnetometer reading.

FIG. 16 is a flowchart of another representative method to estimate a gyroscope scale.

Referring to FIG. 16, the representative method 1600 may include, at block 1610, a device 910 receiving a first input indicating that the device 910 is in a first angular position, as a start position to estimate the gyroscope scale. At block 1620, the device 910 may start an integration period on a condition that the first input is received. At block 1630, the device 910 may sample a set of gyroscope outputs during the integration period. At block 1640, the device 910 may receive a second input indicating that the device 910 is in a second, preconfigured angular position, relative to the starting position, as a final position. At block 1650, the device 910 may end the integration period, on a condition that the second input is received. At block 1660, the device 910 may estimate the gyroscope scale using samples of the set of gyroscope outputs sampled during the integration period. For example, the estimation of the gyroscope scale may include averaging one or more samples taken while the device 910 at the start position, determining, by the device 910, a zero rate offset (ZRO) from the averaged one or more samples taken while the device 910 is at the start position and/or compensating, by the device 910, for the ZRO in the estimation of the gyroscope scale.

In certain representative embodiments, the device 910 may present to an external entity, a first indication that the device 910 is ready to be moved to another position or the final position, after the end of the integration period and/or may present to the external entity, a second indication of whether the estimate of gyroscope scale is within a threshold of a reference gyroscope scale.

In certain representative embodiments, the device 910 may send any of: (1) data associated with the samples sampled during the integration period; (2) estimation information in accordance with the estimation of the gyroscope scale; (3) error codes indicating a type of error associated with a gyroscope scale estimation operation; and/or (4) a calibration record.

FIG. 17 is a flowchart of an additional representative method to estimate a gyroscope scale.

Referring to FIG. 17, the representative method 1700 may include, at block 1710, a device 910 determining that the device 910 is in a first angular position, as a start position. At block 1720, the device 910 may start an integration period based on the determination that the device 910 is in the start position. At block 1730, the device 910 may sample a set of gyroscope outputs during the integration period. At block 1740, the device 910 may determine that the device 910 is in a second, preconfigured angular position, relative to the starting position, as a final position based on samples taken from the gyroscope 240 and/or an accelerometer 260. At block 1750, the device 910 may end the integration period based on the determination that the device is in the final position. At block 1760, the device 910 may estimate the gyroscope scale using samples of the set of gyroscope outputs sampled during the integration period.

In certain representative embodiments, the device 910 may determine that the device 910 is in the start position based on samples from the gyroscope 240 and/or the accelerometer 260 after receiving an indication that the device 910 is in a calibration mode.

FIG. 18 is a flowchart of a further representative method to estimate a gyroscope scale.

Referring to FIG. 18, the representative method 1800 may include, at block 1810, a device 910 starting an integration period on a condition that the device 910 is docked in a docking station 300. At block 1820, the device 910 may read a gyroscope output at the start of the integration period. At block 1930, the device 910 may undock from the docking station 300. At block 1940, the device 910 may rotate one or more predetermined rotations. At block 1950, the device 910 may redock with the docking station 300. At block 1960, the device 910 may end the integration period on a condition that the device 910 is redocked in the docking station 300. At block 1970, the device 910 may read the gyroscope output at the end of the integration period. At block 1980, the device 910 may estimate the gyroscope scale using the readings from the gyroscope output.

In certain representative embodiments, the device 910 may be any of a robotic device, a robotic vacuum cleaner, an Inertial Measurement unit (IMU), a Timing & IMU (TIMU), a mobile device, a head mounted display, a WTRU and/or a smartphone.

In certain representative embodiments, a calibration device 920, 1120 and/or 1220 may be used to estimate a gyroscope scale of a device 910 (e.g., a test device). The calibration device 920, 1120 and/or 1220 may include a member 920 configured with first and second parallel sides 940:950, 1140A:1140C, 1140B:1140D, 1240A:1240C, and 1240B:1240D. The first parallel side (e.g., side 940) may be configured to mate with a first side (e.g., side 930) of the test device 910 to provide a known angular position for the test device 910, as a start position for the test device 910. The second parallel side (e.g. side 950) may be configured to mate with the first side (e.g., side 930 of the test device 910 to provide a second, known angular position for the test device 910, as a final position for the test device 910. For example, a difference between the start position and the final position of the test device 910 may represent a 180° rotation of the test device 910.

In certain representative embodiments, a calibration device 1120 and/or 1220 may be used to estimate a gyroscope scale of a test device 910. The calibration device 1120 and/or 1220 may include a first member (e.g., first member 1140A or 1240A) that may include a least one side. The calibration device 1120 and/or 1220 may include a second member (e.g., second member 1140B or 1240B) including at least one side at a known angle from the side of the first member 1140A or 1240A. The side of the first member 1140A or 1240A may be configured to mate with a first side 930 of the test device 910 to provide a known angular position for the test device 910, as a start position for the test device 910, and the side of the second member 1140B or 1240B may be configured to mate with the first side 930 of the test device 910 to provide a second, known angular position for the test device 910, as a final position for the test device 910. For example, a difference between the start position and the final position of the test device 910 may represent a predetermined and/or preconfigured rotation of the test device 910.

Systems and methods for processing data according to representative embodiments may be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within an RAA and/or other mobile device remotely. In the later a case, data may be transferred via wireline or wirelessly between the RAA or other mobile device containing the sensors and the remote device containing the processor which runs the software which performs the scale estimation and compensation as described above. According to other representative embodiments, some of the processing described above with respect to bias estimation may be performed in the device containing the sensors, while the remainder of the processing may be performed in a second device after receipt of the partially processed data from the device containing the sensors.

Although the foregoing representative embodiments relate to sensing packages including one or more rotational sensors and an accelerometer, bias estimation techniques according to these representative embodiments are not limited to only these types of sensors. Instead bias estimation techniques as described herein can be applied to devices which include, for example, only accelerometer(s), optical and inertial sensors (e.g., a rotational sensor, a gyroscope or an accelerometer), a magnetometer and an inertial sensor (e.g., a rotational sensor, a gyroscope or an accelerometer), a magnetometer and an optical sensor (e.g. a camera, one or more photodiodes, one or more phototransistors), or other sensor combinations. Additionally, although certain representative embodiments described herein relate to gyroscope scale calibration in the context of RAA and applications, such techniques are not so limited and may be employed in methods and devices associated with other robotic device, Inertial Measurement units (IMUs), Timing & IMUs (TIMUs), mobile devices, head mounted displays, WTRUs and/or smartphones, among others.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method, implemented in a device having a gyroscope, to calibrate a gyroscope scale, comprising:
    receiving, by the device, a first input indicating that the device is in a first angular position, as a start position to estimate the gyroscope scale;
    starting an integration period on a condition that the first input is received and the device is ready for calibration;
    presenting, by the device to an external entity, a first indication that the device is ready to be moved to another position or a final position, as an indication that the device is ready for the calibration;
    sampling, by the device, a set of gyroscope outputs during the integration period;
    receiving, by the device, a second input indicating that the device is in a second, preconfigured angular position, relative to the start position, as the final position;
    ending the integration period, on a condition that the second input is received;
    estimating, by the device, the gyroscope scale using samples of the set of gyroscope outputs sampled during the integration period; and
    presenting, by the device to the external entity, a second indication of whether the estimate of gyroscope scale is within a threshold of a reference gyroscope scale.

2. The method of claim 1, wherein the estimating of the gyroscope scale includes:
    averaging one or more samples taken while the device is at the start position;
    determining, by the device, a zero rate offset (ZRO) from the averaged one or more samples taken while the device is at the start position; and
    compensating, by the device, for the ZRO in the estimation of the gyroscope scale.

3. The method of claim 1, wherein the start position is a position such that the device is in a docking station.

4. The method of claim 3, further comprising undocking the device such that the device is undocked from the docking station during the integration period.

5. The method of claim 4, further comprising redocking the device such that the ending of the integration period is further conditioned on the device being redocked in the docking station.

6. The method of claim 1, further comprising:
sending, by the device, any of: (1) data associated with the samples sampled during the integration period; (2) estimation information in accordance with the estimating of the gyroscope scale; (3) error codes indicating a type of error associated with a gyroscope scale estimation operation; or (4) a calibration record.

7. A method, implemented in a device having a gyroscope, to calibrate a gyroscope scale, comprising:
determining, by the device, that the device is in a first angular position, as a start position;
starting an integration period based on the determination that the device is in the start position and the device is ready for calibration;
presenting, by the device to an external entity, a first indication that the device is ready to be moved to another position or the final position, as an indication that the device is ready for the calibration;
sampling, by the device a set of gyroscope outputs during the integration period;
determining, by the device, that the device is in a second, preconfigured angular position, relative to the start position, as the final position based on samples taken from the gyroscope and/or an accelerometer;
ending the integration period based on the determination that the device is in the final position;
estimating, by the device, the gyroscope scale using samples of the set of gyroscope outputs sampled during the integration period; and
presenting, by the device to the external entity, a second indication of whether the estimated gyroscope scale is within a threshold of a reference gyroscope scale.

8. The method of claim 7, wherein the determining that the device is in the start position includes determining that the device is in the start position based on samples from the gyroscope and/or the accelerometer.

9. The method of claim 8, further comprising
receiving, by the device, user input; and
configuring, by the device, to be in a calibration mode based on the received user input.

10. A device having a gyroscope to calibrate a gyroscope scale, comprising:
a user interface configured to receive a first input indicating that the device is in a first angular position, as a start position to estimate the gyroscope scale;
a processor configured to:
start an integration period on a condition that the first input is received and the device is ready for calibration, and
sample a set of gyroscope outputs during the integration period,
wherein:
the user interface is configured to receive a second input indicating that the device is in a second, preconfigured angular position, relative to the start position, as a final position,
the processor is configured to:
end the integration period, on a condition that the second input is received, and
estimate the gyroscope scale using samples of the set of gyroscope outputs sampled during the integration period; and
a display or light configured to:
present, to an external entity, a first indication that the device is ready to be moved to another position or the final position, as an indication that the device is ready for the calibration; and
present to the external entity, a second indication of whether the estimate of gyroscope scale is within a threshold of a reference gyroscope scale.

11. The device of claim 10, wherein the processor is configured to:
average one or more samples taken while the device is at the start position;
determine a zero rate offset (ZRO) from the averaged one or more samples taken while the device is at the start position; and
compensate for the ZRO in the estimation of the gyroscope scale.

12. The device of claim 10, further comprising:
a transmit unit configured to send any of: (1) data associated with the samples sampled during the integration period; (2) estimation information in accordance with the estimation of the gyroscope scale; (3) error codes indicating a type of error associated with a gyroscope scale estimation operation; or (4) a calibration record.

* * * * *